(12) United States Patent
Minato et al.

(10) Patent No.: US 8,368,851 B2
(45) Date of Patent: Feb. 5, 2013

(54) COLOR FILTER FOR LIQUID CRYSTAL DISPLAY DEVICE AND LIQUID CRYSTAL DISPLAY DEVICE

(75) Inventors: Koichi Minato, Tokyo (JP); Mie Shimizu, Tokyo (JP); Toshihisa Watanabe, Osaka (JP); Koki Tsubaki, Kashiwara (JP)

(73) Assignee: Toppan Printing Co., Ltd., Tokyo (JP)

( * ) Notice: Subject to any disclaimer, the term of this patent is extended or adjusted under 35 U.S.C. 154(b) by 125 days.

(21) Appl. No.: 13/064,543

(22) Filed: Mar. 30, 2011

(65) Prior Publication Data

US 2011/0181818 A1 Jul. 28, 2011

Related U.S. Application Data

(63) Continuation of application No. PCT/JP2009/068026, filed on Oct. 19, 2009.

(30) Foreign Application Priority Data

Dec. 18, 2008 (JP) ................................. 2008-322530

(51) Int. Cl.
*G02F 1/1335* (2006.01)
(52) U.S. Cl. ...................................... 349/106
(58) Field of Classification Search .................... 349/106
See application file for complete search history.

(56) References Cited

U.S. PATENT DOCUMENTS

| 2002/0012856 | A1* | 1/2002 | Ohtsu et al. | 430/7 |
| 2003/0129504 | A1* | 7/2003 | Wakata et al. | 430/5 |
| 2003/0169523 | A1* | 9/2003 | Takeda | 359/885 |
| 2005/0074563 | A1* | 4/2005 | Tatsuzawa et al. | 428/1.1 |
| 2008/0180611 | A1 | 7/2008 | Minato et al. | |
| 2010/0244010 | A1* | 9/2010 | Moriya | 257/40 |
| 2010/0244011 | A1* | 9/2010 | Moriya | 257/40 |

FOREIGN PATENT DOCUMENTS

| JP | 05-196930 | 8/1993 |
| JP | 2000-136253 | 5/2000 |
| JP | 2000-187114 | 7/2000 |
| JP | 2006-184427 | 7/2006 |
| JP | 2007-108275 | 4/2007 |
| JP | 2007-171665 | 7/2007 |
| JP | 2007-212603 | 8/2007 |
| JP | 2008-020905 | 1/2008 |
| JP | 2008-040486 | 2/2008 |
| JP | 2008-145868 | 6/2008 |
| JP | 2008-185984 | 8/2008 |

OTHER PUBLICATIONS

International Search Report for PCT/JP2009/068026, mailed Nov. 17, 2009.
Shinsuke Toyomasu et al., "Development of Negative Birefringence Polymeric Material for Novel Wide Viewing Angle Retardation Films", TOSOH Research & Technology Review, vol. 48 (2004), pp. 23-29.
English Abstract.

* cited by examiner

*Primary Examiner* — Timothy L Rude

(57) ABSTRACT

Disclosed a color filter for a liquid crystal display device, which exhibits a color filter contrast of 9000 or more and includes a transparent substrate, and a plurality of color layers exhibiting different color from each other and formed on the transparent substrate, wherein each of the color layers is a cured film of a color resin composition containing a polymer composition obtained through a copolymerization of styrene and an unsaturated carboxylic acid-containing monomer, a content of the styrene in the polymer composition being confined to a range of not less than 75 mol. % and less than 95 mol. %, and a retardation in a thickness direction "Rth" of each of these color layers is confined within a range of 0 nm to −10 nm.

5 Claims, 1 Drawing Sheet

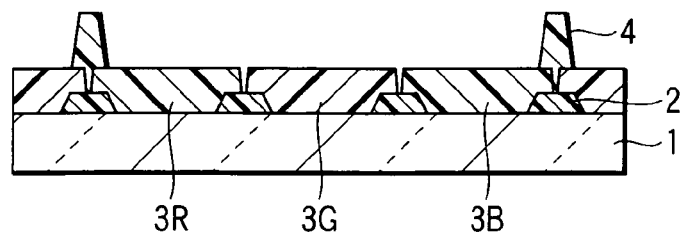
F I G. 1
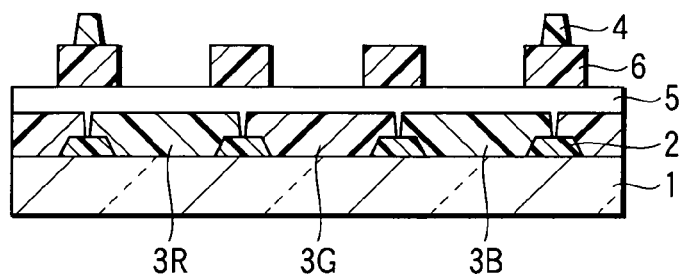
F I G. 2
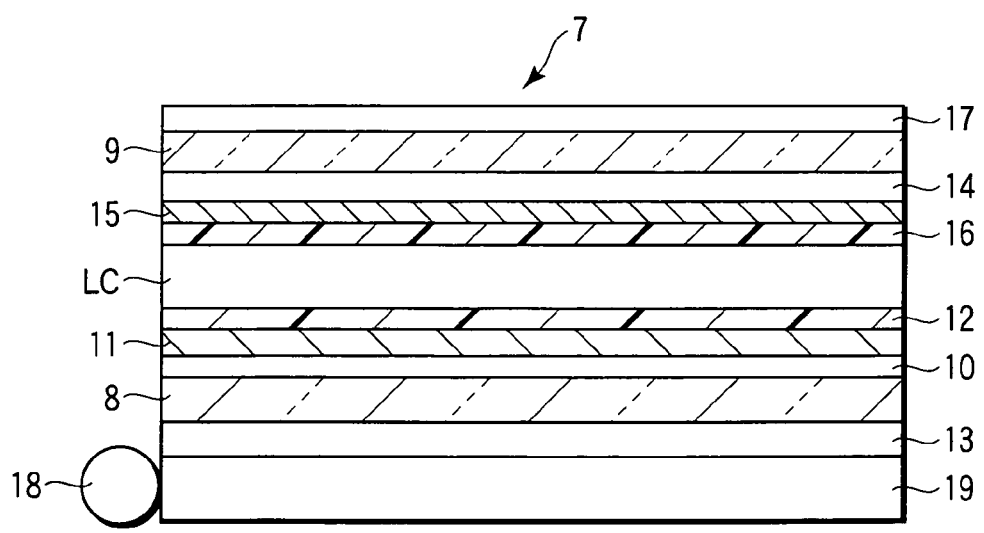
F I G. 3

COLOR FILTER FOR LIQUID CRYSTAL DISPLAY DEVICE AND LIQUID CRYSTAL DISPLAY DEVICE

CROSS REFERENCE TO RELATED APPLICATIONS

This is a Continuation Application of PCT Application No. PCT/JP2009/068026, filed Oct. 19, 2009, which was published under PCT Article 21(2) in Japanese.

This application is based upon and claims the benefit of priority from prior Japanese Patent Application No. 2008-322530, filed Dec. 18, 2008, the entire contents of which are incorporated herein by reference.

BACKGROUND OF THE INVENTION

1. Field of the Invention

This invention relates to a color filter for a liquid crystal display device, and to a liquid crystal display device which is provided with the color filter. In particular, this invention relates to a color filter for a liquid crystal display device, which is excellent not only in contrast but also in oblique visibility and to a liquid crystal display device which is provided with such features.

2. Description of the Related Art

In recent years, thin display devices such as a liquid crystal display device are increasingly demanded to enhance the picture quality and power-saving thereof and to reduce the manufacturing cost thereof. Therefore, in the case of the color filter to be employed in such display devices, it is desired to employ a photosensitive resin composition which is sufficiently high in color purity, in brightness and in contrast and which makes it possible to realize accurate patterning works of color layers having fine patterns, of a spacing layer, of a space controlling layer for controlling cell gap, and of a retardation layer at a low cost while developing the birefringence in conformity with various kinds of liquid crystal display modes.

Especially, in the case of a large television or a high picture quality monitor, where the display contrast thereof is not less than 2000, they are now demanded to exhibit not only a high front face contrast but also a very high level of display quality with respect to wide viewing angle characteristics including oblique viewing direction. It has been found out, as a result of optical designing of a liquid crystal display device as a whole, that it is difficult to completely correct the retardation of color filter, thereby inevitably leaving a small degree of retardation (for example, +10 nm or so) as a value of retardation in the thickness direction of at least one of the layers including the color layers, a spacing layer, a space controlling layer for controlling cell gaps and a retardation layer, thus resulting in the deterioration of oblique visibility.

In order to cope with this problem, various methods have been tried to reduce the quantity of retardation that the color filter may exhibit, the methods including one wherein a macromolecule having a planar structural group on its side chain is introduced into a color layer, or one wherein a birefringence-reducing particles having a double refraction index which is opposite in sign to that of a macromolecule is introduced into a color layer (see for example, JP-A 2000-136253 and JP-A 2000-187114).

Further, there has been proposed an idea to incorporate a retardation-adjusting agent in the color layers of color filter, thus enabling each of subpixels to have a different retardation, thereby making it possible to enable the viewing angle compensation of darkened state of a liquid crystal display device to be effected in the wavelength of almost all visible light zone without necessitating the provision of a polymeric liquid crystal layer in addition to the color layers or without necessitating the change of thickness in each of subpixels (see for example, JP-A 2008-20905, JP-A 2008-40486) and JP-A 2008-145868).

Furthermore, there has been proposed a method of improving the oblique visibility, wherein the values of retardation in thickness direction of the red, green and blue color pixels of color filter (these color pixels are herein defined as Rth(R), Rth(G) and Rth(B), respectively) are regulated, in conformity with the wavelength dispersibility of liquid crystal materials or of retardation films, to Rth(R)>Rth(G)>Rth(B) or Rth(R)<Rth(G)<Rth(B), thereby improving the oblique visibility (see for example, JP-A 2007-212603 and JP-A 5-196930).

However, it has been found out by the present inventors that the value of retardation in a thickness direction which the color layer may exhibit greatly differs depending on the kinds of pigment to be employed and that the magnitude of the value of retardation in a thickness direction becomes larger depending on the pulverization or dispersion of the pigment or on the kinds of matrix resin (for example, acrylic resin, cardo resin, etc.). Therefore, in the case of the conventional methods where a macromolecule having a planar structural group on its side chain is introduced into a color layer, or where a birefringence-reducing particles is introduced into a color layer, even if these methods are effective in increasing the value of retardation in a thickness direction in the positive direction or in decreasing a large positive value of retardation in a thickness direction within a positive range, these methods are not sufficiently effect in shifting the value of retardation in a thickness direction from zero in the negative direction within a small range, thus failing to solve the aforementioned problems.

Further, it has been found difficult to uniformly confine all of the retardations of red, green and blue color pixels to be employed in a color filter to a region ranging from zero to a small negative value while retaining a high contrast of color filter.

Since a styrene-containing polymer composition is excellent in transparency and in heat resistance, it is possible to use it as a color layer of color filter to be employed, for example, in a liquid crystal display, an electronic paper display, an electroluminescence panel, etc., or use it as material for forming a spacing layer. Further, the styrene-containing polymer composition can be modified to exhibit developing properties or photo-curing properties by copolymerizing it with an alkali-soluble monomer such as aromatic/non-aromatic polyvalent carboxylic acid-containing monomers or with a polymeric bonding-containing monomer, thus providing it with excellent functions as a polymeric composition for use as an electronic material.

On the other hand, the aforementioned styrene-containing polymer composition is known to have a negative birefringence (see for example, Development of Negative Birefringence Polymeric Material for Novel Wide Viewing Angle Retardation Films. TOSOH Research & Technology Review Vol. 48 (2004)) and hence has been suitably employed as a material for a negative birefringence retardation film. Therefore, it is expected that the aforementioned problems can be overcome by the incorporation of the styrene-containing polymer composition as a birefringence-adjusting agent in a material to be used for forming at least one layer selected from the color layers, the spacing layer, the space controlling layer for controlling cell gap, and the retardation layer of color filter for liquid crystal display. However, since the retardation of the color filter is relatively small as compared with that of other components to be used in a liquid crystal display device, no one has tried to employ the styrene-containing polymer composition up to date. Namely, there have been reported almost no studies which are dealt with a method of reducing the value of retardation in a thickness direction by the incorporation of a styrene-containing polymer composition into an alkali-developing photosensitive resin composition, for example.

Additionally, there is a problem that when a large quantity of the conventional styrene-containing polymer composition is incorporated into an alkali-developing photosensitive resin composition, storage stability of the photosensitive resin composition is deteriorated. Furthermore, the incorporation of styrene-containing polymer composition may lead to various problems including the deterioration of the alkali-developing properties of the photosensitive resin composition, the prolongation of developing time due to difficulties of suitably adjusting the developing rate, and susceptibility to peeling of a coated film from a substrate due to too fast developing rate on the contrary. Therefore, there is a limit in mixing ratio of the styrene-containing polymer composition, thus making it impossible to enable the styrene-containing polymer composition to sufficiently exhibit the effects thereof as a birefringence-adjusting agent.

BRIEF SUMMARY OF THE INVENTION

Problems to be Solved by the Invention

The present invention has been accomplished in view of the aforementioned circumstances and hence objects of the present invention are to provide a color filter which is not only high in contrast but also excellent in oblique visibility, and to provide a liquid crystal display device which is equipped with such a color filter.

According to a first aspect of the present invention, there is provided a color filter for a liquid crystal display device, which exhibits a color filter contrast of 9000 or more and comprises a transparent substrate, and a plurality of color layers exhibiting different color from each other and formed on the transparent substrate, wherein each of the color layers is a cured film of a color resin composition containing a polymer composition obtained through a copolymerization of styrene and an unsaturated carboxylic acid-containing monomer, a content of the styrene in the polymer composition being confined to a range of not less than 75 mol. % and less than 95 mol. %, and a retardation in a thickness direction "Rth" of each of these color layers, which is represented by the following expression, is confined within a range of 0 nm to −10 nm:

$$Rth=\{(Nx+Ny)/2-Nz\}\times d$$

wherein Nx is a refractive index in x-direction in a plane of a color pixel layer; Ny is a refractive index in y-direction in a plane of the color pixel layer; and Nz is a refractive index in a thickness direction of the color pixel layer, x direction is defined as a lagging axis represented by $Nx \geq Ny$; and d is a thickness (nm) of the color pixel layer.

According to a second aspect of the present invention, there is provided a liquid crystal display device which is provided with the color filter of the first embodiment of the present invention, wherein a color difference Δu'v' between a value of chromaticity as measured from a direction normal to a display surface, and a value of chromaticity as measured from in a direction of 60° inclined from the direction normal to a display surface and in a direction of an azimuthal angle of 45° at display in a darkened (or OFF) state, is not higher than 0.02.

BRIEF DESCRIPTION OF THE SEVERAL VIEWS OF THE DRAWING

FIG. 1 is a cross-sectional view schematically illustrating a color filter according to one embodiment of the present invention;

FIG. 2 is a cross-sectional view schematically illustrating another example of the color filter according to one embodiment of the present invention; and FIG. 3 is a cross-sectional view schematically illustrating one example of a liquid crystal display device which is provided with the color filter of the present invention.

DETAILED DESCRIPTION OF THE INVENTION

There will now be described various embodiments of the present invention.

A color filter for a liquid crystal display device according to one embodiment of the present invention is featured in that it exhibits a color filter contrast of 9000 or more and includes a transparent substrate, and a plurality of color layers exhibiting different colors and formed on the transparent substrate, wherein these color layers are respectively formed of a cured film of a color resin composition containing a polymer composition obtained through a copolymerization of styrene and an unsaturated carboxylic acid-containing monomer, and a retardation in a thickness direction "Rth" of each of these color layers which can be represented by the following expression is confined within the range of 0 nm to −10 nm:

$$Rth=\{(Nx+Ny)/2-Nz\}\times d$$

wherein Nx is a refractive index in x-direction in the plane of a color pixel layer; Ny is a refractive index in y-direction in the plane of the color pixel layer; and Nz is a refractive index in the thickness direction of the color pixel layer. Herein, x direction is defined as a lagging axis represented by $Nx \geq Ny$; and d is a thickness (nm) of the color pixel layer.

A liquid crystal display device which is provided with this color filter exhibits a high contrast and excellent oblique visibility. If the retardation in a thickness direction "Rth" thereof falls outside the range of 0 nm to −10 nm, the oblique visibility thereof may be deteriorated.

Further, when a green color layer containing zinc halide phthalocyanine pigment is employed as a green pigment, it is possible to obtain a color filter for a liquid crystal display device, which is provided with a green color pixel having a retardation in a thickness direction "Rth" ranging from 0 nm to −10 nm and exhibiting a color filter contrast of 9000 or more.

As a result of extensive studies made by the present inventors on a photosensitive composition to be used for forming color filter components such as a coloring layer, a spacing layer, a space controlling layer for controlling cell gap and a retardation layer, it has been found out that a photosensitive composition containing a polymer composition obtained through a copolymerization of styrene and an unsaturated carboxylic acid-containing monomer is useful in forming these color filter components exhibiting excellent performance. Namely, the photosensitive composition which is constructed as described above is excellent in developing properties, in long term storage stability and in developing rate and, furthermore, a coated film which has been cured through the irradiation of light and/or baking is enabled to exhibit a retardation in a thickness direction "Rth" ranging from 0 nm to −10 nm and is excellent in heat resistance, in adhesion to a substrate, in hardness, in solvent resistance and in alkali resistance, thus making it possible to overcome almost all of the aforementioned problems of the prior art.

The polymer composition that has been found out by the present inventors is featured in that it can be obtained through a reaction between styrene and an unsaturated carboxylic acid-containing monomer, that the weight average molecular weight thereof is confined to not more than 30000, the acid value of solid content thereof is confined to 20-180 mgKOH/g, and that the content of styrene thereof is confined to not less than 75 mol. % to less than 95 mol. %. The polymer composition of this kind can be obtained through any reaction method which is well known among persons skilled in the art such as a radical polymerization of the ethylenic unsaturated group of styrene and the ethylenic unsaturated group of an unsaturated carboxylic acid-containing monomer.

The problems to be raised in the employment of the conventional photosensitive resin composition can be overcome by the employment of a photosensitive resin composition which is prepared so as to contain, as described above, a polymer composition having a weight average molecular weight of not more than 30000 and an acid value of solid content which is confined to 20-180 mgKOH/g, thereby enabling the styrene-containing polymer composition to sufficiently exhibit the effects thereof. Namely, the problems accompanied with the employment of a photosensitive resin composition containing a styrene-containing polymer composition having a weight average molecular weight of more than 30000 and an acid value of solid content which falls outside the range of 20-180 mgKOH/g, such as the deterioration of the alkali-developing properties of the photosensitive resin composition, the prolongation of developing time due to difficulties of suitably adjusting the developing rate, and susceptibility to peeling of a coated film from a substrate due to too fast developing rate on the contrary can be overcome.

Further, since the polymer composition to be employed in this embodiment is formulated to contain styrene at a ratio ranging from not less than 75 mol. % to less than 95 mol. %, the polymer composition is enabled to exhibit a negative birefringence which styrene resin inherently has. As a result, it is now possible to overcome various problems accompanied with the formation of the color layers, the spacing layer, the space controlling layer for controlling cell gap, and the retardation layer of color filter for liquid crystal display. Namely, it is possible not only to vanish a redundant positive value (+10 nm-+30 nm or so) of retardation in a thickness direction "Rth" which has been caused to generate by the influences of pigments, dispersing agents and binder resins but also to reduce the value of "Rth" to a negative value. As a result, it is now possible to provide a color filter having a retardation in a thickness direction value ranging from 0 nm to −10 nm that has been essentially desired and to provide a liquid crystal display device which is excellent in display characteristics even if it is viewed obliquely.

If the content of styrene is less than 75 mol. %, it may be impossible of sufficiently vanish a positive value (+2 nm-+30 nm) of retardation in a thickness direction "Rth", thus making it difficult to enable styrene to exhibit its function as a birefringence-adjusting agent.

If the content of styrene is larger than 95 mol. %, it may lead to the deterioration of developing properties and an increasing possibility of leaving the residue thereof after the development. Further, an excessive content of styrene may invite the deterioration in compatibility thereof with other resin components of photosensitive resin composition, which may lead to the deterioration of storage stability.

As for specific examples of the unsaturated carboxylic acid-containing monomer, they include, for example, acrylic acid, methacrylic acid, maleic acid, monoalkyl maleic acid, fumaric acid, monoalkyl fumaric acid, itaconic acid, monoalkyl itaconic acid, crotonic acid, etc. Among them, acrylic acid and methacrylic acid are more preferable for use.

The photosensitive resin composition containing the aforementioned polymer composition may further comprise a photo-polymerizable monomer, a photo-polymerization initiator and acrylic resin, wherein the content of aforementioned polymer composition is confined to 3-60% based on a total solid contents of the photosensitive resin composition. The photosensitive resin composition may further comprise other components such as a photosensitizer, a non-photosensitive resin and/or a photosensitive resin, pigments, a dispersing agent, surfactant, polyfunctional thiol, a storage-stabilizing agent, an adhesion improver and a solvent.

According to the photosensitive resin composition which is formulated as described above, since it contains the aforementioned polymer composition at a ratio of 3-60% based on a total solid contents of the photosensitive resin composition, it is possible to enable the photosensitive resin composition to exhibit the excellent characteristics which the polymer composition inherently has such as heat resistance, adhesion to a substrate, hardness, solvent resistance, alkali resistance and birefringence. Namely, since the aforementioned photosensitive resin composition is imparted with excellent characteristics of the polymer composition such as long term storage stability and birefringence as described above, it can be preferably used for the formation of alkali-developing type photosensitive layers for a color filter such as the color layers, the spacing layer, the space controlling layer for controlling cell gap, and the retardation layer.

When the acid value of acrylic resin in the above-described photosensitive resin composition is confined to 20-180 mgKOH/g, the aforementioned problems such as the prolongation of developing time due to difficulties of suitably adjusting the developing rate, and susceptibility to peeling of a coated film from a substrate due to too fast developing rate on the contrary can be overcome, thereby making it possible to regulate the alkali developing properties of photosensitive resin composition to optimum conditions. More preferable range of acid value of acrylic resin may be 50-180 mgKOH/g.

Further, the double-bond equivalent of the acrylic resin may preferably be not less than 100, more preferably 100-2000, most preferably 100-1000. When the double-bond equivalent of the acrylic resin is regulated in this manner, the exposure sensitivity of the photosensitive resin composition can be sufficiently secured, thereby preventing the deterioration of productivity due to the prolongation of the exposure time required for the sufficient curing thereof that would be caused by insufficient sensitivity of the photosensitive resin composition. Meanwhile, the photosensitive resin composition may further contain pigments and a dispersing agent.

The photosensitive resin composition formulated as described above can be used for the formation of at least one kind of layer selected from color filter coloring layers, the spacing layer, and the retardation layer. UV exposure or deep UV exposure can be used as a curing method for the curing of the aforementioned photosensitive resin composition.

The styrene-containing polymer composition to be contained in the photosensitive resin composition may be used singly or in combination of two or more kinds thereof.

Next, the components of the photosensitive resin composition explained above other than the above-described polymer component will be explained as follows.

(Acrylic Resin)

As for specific examples of the acrylic resin, they include following materials.

Acrylic resins include polymers obtained from the monomers, for example, (metha)acrylic acid; alkyl (metha)acrylate such as methyl (metha)acrylate, ethyl (metha)acrylate, propyl (metha)acrylate, butyl (metha)acrylate, t-butyl (metha)acrylate, benzyl (metha)acrylate, lauryl (metha)acrylate, etc.; hydroxyl group-containing (metha)acrylate such as hydroxyethyl (metha)acrylate, hydroxypropyl (metha)acrylate, etc.; ether group-containing (metha)acrylate such as ethoxyethyl (metha)acrylate, glycidyl (metha)acrylate, etc.; and alicyclic (metha)acrylate such as cyclohexyl (metha)acrylate, isobornyl (metha)acrylate, dicyclopentenyl (metha)acrylate, etc.

Incidentally, these monomers can be used singly or in combination of two or more kinds. Further, other kinds of compounds which can be co-polymerized with these monomers such as styrene, cyclohexyl maleimide, phenyl maleimide, etc. can be used as a copolymer.

It is also possible to obtain photosensitive resins through the reaction of a copolymer of carboxylic acid having an ethylenic unsaturated group such as (metha)acrylic acid and a compound having epoxy group and unsaturated double bond such as glycidyl methacrylate or through the addition of a carboxylic acid-containing compound such as (metha)acrylic acid to a polymer of epoxy group-containing (metha)acrylate such as glycidyl methacrylate or to a copolymer of epoxy group-containing (metha)acrylate with other kinds of (metha)acrylate.

It is also possible to obtain a photosensitive resin through the reaction between a polymer having hydroxyl group and constituted by a monomer such as hydroxyethyl methacrylate and a compound having an isocyanate group and an ethylenic unsaturated group such as methacryloyloxyethyl isocyanate.

Further, a resin having carboxylic group can be obtained through a reaction between a copolymer of hydroxyethyl methacrylate having a plurality of hydroxyl groups and a polybasic acid anhydride, thereby introducing carboxylic group into the copolymer. The manufacturing method thereof may not be limited to the above-described method.

As for specific examples of the acid anhydride to be employed in the aforementioned reaction, they include, for example, malonic anhydride, succinic anhydride, maleic anhydride, itaconic anhydride, phthalic anhydride, tetrahydrophthalic anhydride, hexahydrophthalic anhydride, methyltetrahydrophthalic anhydride, trimellitic anhydride, etc.

The acid value of solid content of above-described acrylic resin may preferably be confined to 20-180 mgKOH/g. If this acid value is less than 20 mgKOH/g, the developing rate of the photosensitive resin composition becomes to slow, thereby taking a lot of time for executing the development thereof, thus leading to the decrease of productivity. On the other hand, if the acid value of solid content is larger than 180 mgKOH/g, the developing rate of the photosensitive resin composition becomes to fast on the contrary, thereby inviting the generation of problems such as peeling of pattern after the development thereof or the chip-off of pattern.

Further, in the case where the aforementioned acrylic resin is photo-sensitive, the double-bond equivalent of the acrylic resin may preferably be not less than 100, more preferably 100-2000, most preferably 100-1000. If the double-bond equivalent thereof is higher than 2000, it may become difficult to secure sufficient photo-curing properties.

(Photopolymerizable Monomer)

As for specific examples of the photopolymerizable monomer, they include (metha)acrylic acid; styrene; vinyl acetate; (metha)acryl amide; N-hydroxymethyl (metha)acryl amide; acrylonitrile; various kinds of acrylic esters and methacrylic esters such as 2-hydroxyethyl(metha)acrylate, 2-hydroxypropyl(metha)acrylate, cyclohexyl(metha)acrylate, polyethyleneglycol di(metha)acrylate, pentaerythritol tri(metha)acrylate, trimethylolpropane tri(metha)acrylate, dipentaerythritol hexa(metha)acrylate, tricyclodecanyl (metha)acrylate, melamine (metha)acrylate, epoxy(metha)acrylate, etc.

Further, it is preferable to employ polyfunctional urethane acrylate having (metha)acryloyl group which can be obtained through the reaction between (metha)acrylate having hydroxyl group and polyfunctional isocyanate. Incidentally, the combination between the (metha)acrylate having hydroxyl group and polyfunctional isocyanate may be optionally selected and hence there is not any particular limitation. Further, only one kind of polyfunctional urethane acrylate may be used singly or polyfunctional urethane acrylate may be used in a combination of two or more kinds thereof.

(Photo-Polymerization Initiators)

As for specific examples of the photo-polymerization initiator, they include an acetophenone-based compound such as 4-phenoxy dichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-benzyl-2-dimethylamino-1-(4-morpholinophenyl)-butan-1-one; a benzoin-based compound such as benzoin, benzoin methyl ether, benzoin ethyl ether, benzoin isopropyl ether, benzyldimethyl ketal, etc.; a benzophenone-based compound such as benzophenone, benzoylbenzoic acid, benzoylmethyl benzoate, 4-phenyl benzophenone, hydroxybenzophenone, acrylated benzophenone, 4-benzoyl-4'-methyldiphenyl sulfide, etc.; a thioxanthone-based compound such as thioxanthone, 2-chlorothioxanthone, 2-methylthioxanthone, isopropylthioxanthone, 2,4-diisopropylthioxanthone, etc.; a triazine-based compound such as 2,4,6-trichloro-s-triazine, 2-phenyl-4,6-bis(trichloromethyl)-s-triazine, 2-p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2,4-trichloromethyl-(piperonyl)-6-triazine, 2,4-trichloromethyl(4'-methoxystyryl)-6-triazine, etc.; an oxime ester-based compound such as 1,2-octanedione, 1-[4-(phenylthio)-2-(O-benzoyloxime)], O-(acetyl)-N-(1-phenyl-2-oxo-2-(4'-methoxynaphthyl)ethylidene)hydroxyl amine, etc.; a phosphine-based compound such as bis(2,4,6-trimethylbenzoyl)phenylphosphine oxide, 2,4,6-trimethylbenzoyl diphenylphosphine oxide, etc.; a quinine-based compound such as 9,10-phenanthrene quinine, camphor quinine, ethyl anthraquinone, etc.; a borate-based compound; a carbazol-based compound; an imidazole-based compound, a titanocene-based compound, etc.

These photo-polymerization initiators can be employed singly or in combination of two or more kinds thereof.

(Photo-Sensitizer)

It is preferable to use these photo-polymerization initiators in combination with a photo-sensitizer. Specific examples of the photo-sensitizer include α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl) benzophenone, 4,4'-diethyl aminobenzophenone, etc.

These sensitizers can be employed at a ratio of 0.1 to 60 parts by mass based on 100 parts by mass of the photopolymerization initiator.

(Non-Photosensitive Resin and/or Photosensitive Resin)

The color composition according to the second embodiment of the present invention may constructed such that it includes a non-photosensitive resin and/or a photosensitive resin exhibiting a permeability of preferably not less than 80%, more preferably not less than 95% in a total wavelength range of 400-700 nm of visible light zone.

As for specific examples of the transparent resin, they include thermoplastic resin, thermosetting resin and photosensitive resin. Examples of the thermoplastic resin include, for example, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene, polyamide resin, rubber type resin, cyclized rubber-based resin, celluloses, polybutadien, polyethylene, polypropylene, polyimide, etc. Examples of the thermosetting resin include, for example, epoxy resin, benzoguanamine resin, rosin-modified maleic resin, rosin-modified fumaric acid resin, melamine resin, urea resin, phenol resin, etc. It is also possible to employ, as thermosetting resin, compounds obtained through a reaction between melamine resin which is described below and a compound having isocyanate group. Specific examples of the melamine resin include the compounds having a formula (I) shown below and polymers thereof.

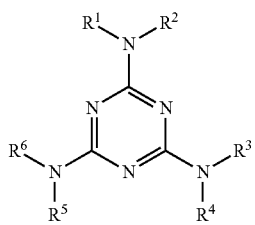

wherein $R^1$-$R^6$ may be the same or different and are individually hydrogen atom or $CH_2OR$ (R is hydrogen atom or alkyl group and may be the same or different in $R^1$-$R^6$).

It is also possible to co-use two or more kinds of homopolymers or copolymers. It is also possible to use, other than the above-described compounds, a compound having 1,3,5-triazine ring which is shown in JP-A 2001-166144. It is also possible to preferably use the compounds represented by the following formula (II).

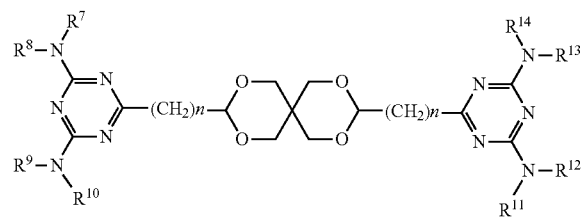

wherein $R^7$-$R^{14}$ may be the same or different and are individually hydrogen atom, alkyl group, alkenyl group or heterocyclic group; hydrogen atom being most preferable among these groups.

As for specific examples of the compound having isocyanate group and being useful in the aforementioned reaction, they include various kinds of known isocyanates such as aromatic, aliphatic or alicyclic isocyanates.

For example, it is possible to employ aromatic polyisocyanate such as 1,5-naphthylene diisocyanate, 4,4'-diphenyl methane diisocyanate, 4,4'-diphenyldimethyl methane diisocyanate, 4,4'-dibenzyl diisocyanate, dialkyldiphenyl methane diisocyanate, tetraalkyldiphenyl methane diisocyanate, 1,3-phenylene diisocyanate, 1,4-phenylene diisocyanate, tolylene diisocyanate, xylylene diisocyanate, m-tetramethyl xylylene diisocyanate, etc.; aliphatic polyisocyanate such as butane-1,4-diisocyanate, hexamethylene diisocyanate, isopropylene diisocyanate, methylene diisocyanate, 2,2,4-trimethylhexamethylene diisocyanate, 2,4,4-trimethylhexamethylene diisocyanate, etc.; alicyclic polyisocyanate such as cyclohexane-1,4-diisocyanate, isophorone diisocyanate, lysine diisocyanate, dicyclohexylmethane-4,4'-diisocyanate, 1,3-bis(isocyanate methyl) cyclohexane, methylcyclohexane diisocyanate, etc.; and dimer diisocyanate wherein carboxyl group of dimer acid is converted to isocyanate group.

When it is desired to impart photosensitivity to the thermosetting resin, a compound having isocyanate group and a double-bonding group can be suitably employed. Examples of such a compound include 2-acryloyloxyethyl isocyanate, 2-methacryloyloxyethyl isocyanate, 1,1'-(bisacryloyloxymethyl)ethyl isocyanate, etc.

Examples of an acid anhydride to be used in the aforementioned reaction include malonic anhydride, succinic anhydride, maleic anhydride, itaconic anhydride, phthalic anhydride, hexahydrophthalic anhydride, tetrahydrophthalic anhydride, methyltetrahydrophthalic anhydride, etc.

In this thermosetting resin, the acid value of solid content thereof is required to be confined to 3-60 mgKOH/g, preferably 20-50 mgKOH/g. Accordingly, the addition reaction of the acid anhydride is performed quantitatively so as to confine the acid value to fall within this range.

If this acid value is less than 3 mgKOH/g, defective development may be caused to occur in the alkali-developing process. On the other hand, if this acid value is larger than 60 mgKOH/g, various problems may be caused to occur such as invasion of the surface of exposure portions in the process of alkali-development or deterioration of long-term storage stability of the photosensitive resin composition. The aforementioned thermosetting resin can be prepared according any one of the following methods.

(1) A method of mixing melamine resin and a compound having isocyanate group while warming to react with each other.

(2) A method of mixing melamine resin and a compound having isocyanate group while warming to react with each other, and then adding an acid anhydride to the reacted product while warming to react with each other.

(3) A method of mixing melamine resin and an acid anhydride while warming to react with each other.

These methods may further include, as pretreatments, a step of distilling out low-boiling alcohol compounds by making use of an evaporator and a step of solvent replacement using another solvent which is suited for the photosensitive resin composition.

Generally speaking, thermosetting resins such as melamine resin are high in thermal reactivity and poor in long-term storage stability, so that it has been considered difficult to incorporate a large quantity of thermosetting resin in the photosensitive resin composition. In the case of the aforementioned thermosetting resins however, since some of a plurality of thermally reactive groups existing in the skeleton of melamine resin are consumed for the reaction thereof with a compound or acid anhydride having isocyanate group, the thermal reactivity thereof is appropriately reduced, thereby making them effective in improving the long-term storage stability of the photosensitive resin composition. Furthermore, as a result of the reaction of melamine resin with a compound or acid anhydride having isocyanate group, the polymer chain of melamine resin is elongated to restrain the free movement of the skeleton of melamine resin, thereby bringing about advantages of improving the storage stability thereof.

Melamine resin provides a tendency to increase the retardation of the color filter. Hence, melamine resin can be used as a retardation-increasing agent for adjusting the retardation in the color filter of the present invention. Likewise, an organic compound having benzyl group can be used as a retardation-adjusting agent for adjusting the retardation of the color filter.

By way of the reaction of melamine resin with acid anhydride or a compound having isocyanate group, it is possible to impart alkali-developing property and/or photosensitivity, both required in an alkali-developing type photosensitive resin composition, to the melamine resin. By providing the melamine resin with alkali-developing property and/or photosensitivity, the adhesion thereof to a substrate can be improved, thereby realizing a photosensitive resin composition which is excellent in process margin so as to prevent the generation of problems in the step of development.

Furthermore, when the photosensitive resin composition contains the aforementioned thermosetting resin, a sufficient heat resistance, hardness, solvent resistance and alkali resistance are imparted to the coated film of the photosensitive resin composition that has been cured.

Additionally, when the photosensitive resin composition contains an appropriate quantity of the thermosetting resin, it is not only possible to minimize the elution of ionic impurities which are contained in pigments or in other kinds of particulate or which are intruded into the photosensitive resin composition during the manufacture of the photosensitive resin composition but also possible to improve the electric characteristics of the photosensitive resin composition. Namely, the reaction of the thermosetting resin is taken place in the photosensitive resin composition on baking and curing the photosensitive resin composition for the formation of the colored layer, the spacing layer, the space controlling layer for controlling cell gap and the retardation layer, thereby enabling pigments and other kinds of particulate to be trapped inside the mesh of polymer, thus making it possible to inhibit the elution of ionic impurities.

Furthermore, when an appropriate quantity of the thermosetting resin is incorporated in the photosensitive resin composition, the aromatic ring of the thermosetting resin is enabled to act electronically, thus making it possible to adjust the electric characteristics of the cured film. As a result, it is now possible to provide a liquid crystal display device which is excellent in electric characteristics and is free from seizing and color drift even if the display device is used for long hours.

(Pigments)

When the layer of the photosensitive resin composition is a color layer of color filter, pigments are required to be additionally incorporated in the photosensitive resin composition.

Even in the cases of the spacing layer, the space controlling layer for controlling cell gap and the retardation layer, all being not of color layer, pigments may be incorporated therein for imparting light-shielding properties to these layers. As for the pigments to be used for forming the color layers and for imparting light-shielding properties to these layers, it is possible to employ known pigments and to incorporate them in the photosensitive resin composition. With respect to the content of pigments, although there is not any particular limitation, the pigment may preferably be incorporated at a content of about 5-70% by mass, more preferably, about 5-50% by mass, most preferably about 20-50% by mass based on a total quantity (100% by mass) of the resin composition, the balance being substantially constituted by a resinous binder that can be provided by a pigment carrier.

Further, for the purpose of spectral adjustment of color filter, these pigments may be used in combination of two or more kinds thereof. These pigments may be incorporated in the color composition at a content of 5-70% by mass based on a total quantity (100% by mass) of the solid contents of the color composition.

Further, in order to secure excellent coating properties, sensitivity, developing properties while making it possible to retain balance between the chroma and lightness, the aforementioned organic pigments may be used in combination with inorganic pigments. As for the inorganic pigments, it is possible to employ metal oxide powder, metal sulfide powder or metal powder such as yellow lead, zinc chrome, red iron oxide (III), cadmium red, ultramarine blue, Prussian blue, chromium oxide green, cobalt green, etc. For the purpose of toning, the color composition may further contain dyes within the limits which do not deteriorate the heat resistance of the color composition.

(Dispersing Agent)

On dispersing the pigment in a pigment carrier and in an organic solvent, a dispersing agent or a surfactant is required to be used for the dispersion of the pigment. With respect to the dispersing agent, it is possible to employ a surfactant, an intermediate of pigment, an intermediate of dye, a Solsperse, etc. These dispersing agents are respectively provided with not only a pigment affinity moiety exhibiting pigment-adsorbing properties, but also another moiety exhibiting compatibility to a pigment carrier, thereby enabling the dispersing agents to adsorb onto the pigment and to stabilize the dispersion of the pigment in the pigment carrier.

As for specific examples of the dispersing agent, they include polyurethane, polycarboxylate such as polyacrylate, unsaturated polyamide, polycarboxylic acid, (partial) amine polycarboxylate, ammonium polycarboxylate, alkyl amine polycarboxylate, polysiloxane, long chain polyaminoamide phosphate, hydroxyl group-containing polycarboxylate and modified compounds thereof, an oily dispersing agent such as amide formed through a reaction between poly(lower alkyl imine) and polyester having a free carboxyl group and salts of the amide, (metha)acrylic acid-styrene copolymer, (metha)acrylic acid-(metha)acrylate copolymer, styrene-maleic acid copolymer, water-soluble resin or water-soluble polymer compound such as polyvinyl alcohol and poly(vinyl pyrrolidone), polyester compounds, modified polyacrylate compounds, ethylene oxide/propylene oxide adduct, phosphate, etc. These compounds may be employed individually or in combination of two or more kinds.

Although there is not any particular limitation with regard to the mixing ratio of the dispersing agent, it is preferable to incorporate the dispersing agent at a ratio of 1-10% by mass based on 100% by mass of the quantity of pigments. Further, The color composition may preferably be formulated such that bulky particles 5 μm or more in size, preferably, bulky particles 1 μm or more in size, more preferably, bulky particles 0.5 μm or more in size as well as dusts intermingled therein are completely removed from the composition by making use of centrifugal separation, sintered filter, membrane filter, etc.

(Surfactants)

As for the surfactant, it is possible to employ an anionic surfactant such as polyoxyethylene alkylether sulfate, dodecylbenzene sodium sulfonate, alkali salts of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer, polyoxyethylene alkylether phosphate, etc.; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate, polyethyleneglycol monolaurate, etc.; cationic surfactant such as alkyl quaternary ammonium salt and an ethylene oxide adduct thereof, etc.; and an amphoteric surfactant such as alkyl betaine such as betaine alkyldimethyl aminoacetate, alkylimidazoline, etc. These surfactants can be employed singly or in combination of two or more kinds.

(Polyfunctional Thiol)

The photosensitive resin composition may contain polyfunctional thiol which is capable of acting as a chain-transfer agent. The polyfunctional thiol is useful as long as the compound thereof has two or more thiol groups. Specific examples of the polyfunctional thiol include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc.

These polyfunctional thiols can be employed singly or in combination of two or more kinds. The content of these polyfunctional thiols may preferably be confined to 0.2-150 parts by mass, more preferably 0.2-100 parts by mass based on 100 parts by mass of the pigment in the color composition.

(Storage Stabilizing Agent)

The photosensitive resin composition may further contain a storage stabilizing agent for stabilizing the variation with time in viscosity of the composition. Specific examples of the storage stabilizing agent include, for example, quaternary ammonium chlorides such as benzyltrimethyl chloride, diethylhydroxy amine, etc.; organic acids such as lactic acid, oxalic acid, etc. and methyl ethers thereof; t-butyl pyrocatechol; organic phosphine such as triethyl phosphine, triphenyl phosphine, etc.; phosphite; etc. The storage stabilizing agent can be employed at a ratio of 0.1-10 parts by mass based on 100 parts by mass of the pigments in a coloring composition.

(Adherence Improver)

Further, the photosensitive resin composition may contain an adherence improver such as a silane coupling agent for the purpose of enhancing the adhesion thereof to a substrate. As for specific examples of the silane coupling agent, they include vinyl silanes such as vinyl tris(β-methoxyethoxy) silane, vinylethoxy silane, vinyltrimethoxy silane, etc.; (metha)acrylsilanes such as γ-methacryloxypropyltrimethoxy silane, etc.; epoxy silanes such as β-(3,4-epoxycyclohexyl)ethyl silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane, γ-glycidoxypropyl triethoxy silane, etc.; amino silanes such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane, N-phenyl-γ-aminopropyl triethoxy silane, etc.; and thiosilanes such as γ-mercaptopropyl trimethoxy silane, γ-mercaptopropyl triethoxy silane, etc. These silane coupling agents can be used at a ratio of 0.01-10 parts by mass based on 100 parts by mass of the pigments in a coloring composition.

(Solvents)

The photosensitive resin composition may further contain a solvent such as water, organic solvents, etc. so that the surface of a substrate is uniformly coated therewith. Further, in the case where the photosensitive resin composition of the present invention is to be used for constituting the color layer of color filter, the solvent acts to enable pigments to be uniformly dispersed in the color layer. Specific examples of the solvent include, for example, cyclohexanone, ethyl Cellosolve acetate, butyl Cellosolve acetate, 1-methoxy-2-propyl acetate, diethyleneglycol dimethyl ether, ethyl benzene, ethyleneglycol diethyl ether, xylene, ethyl Cellosolve, methyl-n amyl ketone, propyleneglycol monomethyl ether, toluene, methylethyl ketone, ethyl acetate, methanol, ethanol, isopropyl alcohol, butanol, isobutyl ketone, petroleum solvent, etc. These solvents may be employed singly or in combination of two or more kinds. The mixing ratio of these solvents may be confined to the range of 800 to 4000 parts by mass, preferably 1000 to 2500 parts by mass based on 100 parts by mass of the pigments in the color composition.

(Method of Preparing the Photosensitive Resin Composition)

The photosensitive resin composition can be prepared by way of any conventional method. For example, a photosensitive color composition containing a photo-polymerizable monomer, a thermosetting resin, a pigment, a dispersing agent and a solvent may be prepared according to the following methods.

(1) A pigment composition containing a pigment and a dispersing agent is added to and dispersed in a mixture of photo-polymerizable monomer and thermosetting resin or in a solution comprising these components dissolved in a solvent. Then, residual components are added to the resultant dispersion.

(2) A pigment and a dispersing agent are separately added to and dispersed in a mixture of photo-polymerizable monomer and thermosetting resin or in a solution comprising these components dissolved in a solvent. Then, residual components are added to the resultant dispersion.

(3) A pigment is added to and dispersed in a mixture of photo-polymerizable monomer and thermosetting resin or in a solution containing these components dissolved in a solvent. Then, a dispersing agent is added to the resultant dispersion and then residual components are added to the resultant dispersion.

(4) Two mixtures each containing a photo-polymerizable monomer and the thermosetting resin or two solutions each containing these components dissolved in a solvent are prepared in advance and then a pigment and a dispersing agent are separately dispersed in aforementioned two mixtures or solutions. Then, these dispersions are mixed together and then residual components are added to the resultant dispersion. Incidentally, either the pigment or the dispersing agent may be dissolved only in the solvent.

Herein, the dispersion of the pigment and the dispersing agent in a mixture of photo-polymerizable monomer and thermosetting resin or in a solution containing these components dissolved in a solvent may be performed by making use of various kinds of dispersing apparatus such as a triple roll mill, a twin-roll mill, a sand mill, a kneader, a dissolver, a high-speed mixer, a homomixer, an attritor, etc. Further, in order to execute the dispersion more preferably, the dispersion may be performed by the addition of various kinds of surfactant.

Although the preparation of a pigment composition containing a pigment and a dispersing agent may be performed by simply mixing a powdery pigment with a powdery dispersing agent, it is more preferable to employ the following mixing methods, i.e. (a) a mechanical mixing method using various kinds of grinders such as a kneader, a roll, an attritor, a super mill, etc.; (b) a method wherein a pigment is dispersed in a solvent to obtain a dispersion to which a solution containing a dispersing agent is added, thereby enabling the dispersing agent to be adsorbed onto the surface of pigment; (c) a method wherein a pigment and a dispersing agent are co-dissolved in a solvent exhibiting a strong dissolving power such as sulfuric acid and then co-precipitation is executed by making use of a poor solvent such as water, etc.

(Color Filter)

Next, although a method for forming the color layer for color filter will be explained, this method can be also applied in the same manner to the formation of the other layers such as a spacing layer, a space controlling layer for controlling cell gap and a retardation layer. The spacing layer is designed to make uniform the cell gap of a liquid crystal display device which is formed on the surface of a substrate provided with the color layer. Incidentally, in the present invention, pixel units which are constituted by a red color layer, a green color layer or a blue color layer, each disposed in the openings of black matrix will be referred to as a red color pixel (or red pixel), a green color pixel (or green pixel) and a blue color pixel (or blue pixel), respectively.

FIG. 1 is a cross-sectional view schematically illustrating the color filter according to the third aspect of the present invention.

As shown in FIG. 1, a black matrix 2 which is obtained by patterning a metal such as chromium or a photo-sensitive black resin composition is formed on the surface of a substrate 1 by means of the conventional method. As for the substrate 1 to be employed herein, it is preferable to use a transparent substrate such as a glass substrate or a resinous substrate made of polycarbonate, poly-methyl methacrylate, polyethylene phthalate, etc. Further, in order to drive the liquid crystal after the fabrication of a liquid crystal panel, a transparent electrode consisting of a composite of metal oxides such as indium oxide, tin oxide, zinc oxide and antimony oxide may be formed on the surface of a glass plate or a resinous plate.

First of all, the surface of the substrate 1 is uniformly coated with the photosensitive resin composition according to the second embodiment of the present invention by any method such as spray coating, spin coating, roll coating, etc., thereby forming a layer, which is then dried to form a photosensitive resin composition layer. Then, by means of photolithography, the photosensitive resin composition layer thus formed is subjected to a patterning process. Namely, the photosensitive resin composition layer is exposed to the irradiation of an active energy beam such as ultraviolet rays, electron beam, etc. through a photomask having a desired light-shielding pattern and then the resultant photosensitive resin composition layer is developed by a developing solution such as an organic solvent or an alkali aqueous solution. In this exposure process, the photo-polymerizable monomer contained in the photosensitive resin composition and located on the regions irradiated with the active energy beam is allowed to polymerize and cure. Further, when the photosensitive resin composition contains a photosensitive resin, this photosensitive resin is also allowed to cross-link and cure.

Further, in order to enhance the exposure sensitivity, a water-soluble or alkali-soluble resin (for example, polyvinyl alcohol or a water-soluble acrylic resin) may be coated, prior to the step of exposure, on the surface of the coated photosensitive resin composition layer and dried, thereby forming a film which is capable of suppressing the effects of oxygen to obstruct the polymerization.

In the step of the development, the portions of the photosensitive resin composition layer which are not irradiated with the active energy beam are washed out by a developing solution to obtain a desired pattern. As for the method of developing treatment, it is possible to employ a shower developing method, a spray developing method, a dip developing method, a paddle developing method, etc. Incidentally, with respect to the developing solution, an alkali developing solution such as an aqueous solution of sodium carbonate, sodium hydroxide, etc. or an organic alkaline solution such as dimethylbenzyl amine, triethanol amine, etc. may be mainly employed. Further, if required, the developing solution may contain a defoaming agent or a surfactant.

Finally, the resultant layer thus developed is baked, and the same procedures as described above are repeated for other colors, thus manufacturing a color filter. More specifically, red color pixels 3R, green color pixels 3G and blue color pixels 3B are formed on the surface of substrate 1 having a black matrix 2 formed thereon. Namely, the color layer is constituted by these red color pixels 3R, green color pixels 3G, blue color pixels 3B and the black matrix 2.

Moreover, in order to make uniform the cell gap of liquid crystal display device, a counter substrate carrying layer 4 may be formed on these color pixels. As shown in FIG. 1, the counter substrate carrying layer 4 may preferably be formed at a location which corresponds to the black matrix 2.

Further, in the case of the color filter shown in FIG. 2, a retardation layer 5, a space controlling layer 6 for controlling cell gap and a spacing layer 4 are formed on the surface of the substrate 1 provided in advance with the color layers. At least one of these retardation layer 5, space controlling layer 6 for controlling cell gap and spacing layer 4 may be formed in the same manner as described above in the formation of the color layers.

Next, there will be explained about the liquid crystal display device which is provided with the color filter explained above.

FIG. 3 is a cross-sectional view schematically illustrating the liquid crystal display device which is provided with a color filter according to a third embodiment of the present invention.

The liquid crystal display device 7 shown in FIG. 3 illustrates a typical example of a TFT drive type liquid crystal display device for use in a notebook-sized personal computer. This liquid crystal display device 7 is provided with a pair of transparent substrates 8 and 9, which are arranged face to face with a gap interposed therebetween. The gap between them is filled with a liquid crystal (LC).

The liquid crystal (LC) can be orientated according to any liquid crystal alignment mode such as TN (Twisted Nematic), STN (Super Twisted Nematic), IPS (In-Plane switching), VA (Vertical Alignment), OCB (Optically Compensated Birefringence), etc.

On the inner wall of the first transparent substrate 8, there is formed a TFT (thin film transistor) array 10. On this TFT array 10 is deposited a transparent electrode layer 11 formed of ITO for example. On this transparent electrode layer 11 is further provided an alignment layer 12. Further, a polarizing plate 13 having a retardation film in its structure is formed on the outer surface of the transparent substrate 8.

On the other hand, on the inner wall of the second transparent substrate 9, there is formed a color filter 14 as shown in FIG. 1 or FIG. 2. The filter segments of red pixels, green pixels and blue pixels constituting the color filter 14 are separated from each other by a black matrix (not shown). If required, a transparent protective film (not shown) may be formed so as to cover the color filter 14. Furthermore, a transparent electrode layer 15 made of ITO for example is formed on this protective film. An alignment layer 16 is formed so as to cover the transparent electrode layer 15. Further, a polarizing plate 17 is formed on the outer surface of the transparent substrate 9. Incidentally, a back light unit 19 equipped with a triple wavelength lamp 18 is disposed below the polarizer 13.

EXAMPLES

Although the present invention will be explained below by referring to specific examples of the present invention and to comparative examples, it should not be construed that the present invention is limited to these examples. Further, since the materials to be employed in the present invention are very sensitive to light, it is required to prevent the sensitization of the materials by redundant light such as natural light, so that every works were performed under the yellow or red lamp. Incidentally, "part(s)" in the following examples and comparative examples means "mass part(s)". Further, the symbols of pigments are indicated by a color index number. For example, "PG36" means "C.I. Pigment Green 36", and "PY150" means "C.I. Pigment Yellow 150".

(Synthesis of Polymer Compositions)

The polymer compositions each constituted by styrene and an unsaturated carboxylic acid-containing monomer and employed in Examples and Comparative Examples were prepared as follows. Incidentally, the molecular weight of the resins was a weight average molecular weight reduced as polystyrene and measured by means of gel permeation chromatography (GPC).

Synthesis Example 1

Polymer Composition 1

160 g of styrene, 20 g of maleic anhydride, 420 g of cyclohexanone and 2 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining styrene-maleic anhydride copolymer 1. The weight average molecular weight of the styrene-maleic anhydride copolymer 1 thus obtained was 11000. Then, 75 g of 20% aqueous solution of sodium hydroxide was added to the styrene-maleic anhydride copolymer 1 thus obtained and the resultant mixture was heated for one hour at 75° C. After being cooled down to 30° C., the mixture thus obtained was mixed with 170 g of 10% hydrochloric acid and stirred for one hour. Then, 180 g of cyclohexanone and 180 g of water were added to the mixture and stirred for 30 minutes. An aqueous layer formed in the mixture was separated to obtain a styrene-maleic acid copolymer. The weight average molecular weight of the styrene-maleic acid copolymer thus obtained was 11000.

Synthesis Example 2

Polymer Composition 2

160 g of styrene, 20 g of maleic anhydride, 420 g of cyclohexanone and 2 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining styrene-maleic anhydride copolymer 1. The weight average molecular weight of the styrene-maleic anhydride copolymer 1 thus obtained was 11000. Then, 36 g of 1-dodecanol and 0.5 g of triphenyl phosphine were added to the styrene-maleic anhydride copolymer 1 thus obtained and heated for 20 hours at 145° C.

Thereafter, to the resultant mixture was added 39 g of 20% aqueous solution of sodium hydroxide and the resultant mixture was heated for one hour at 75° C. After being cooled down to 30° C., the mixture thus obtained was mixed with 71 g of 10% hydrochloric acid and stirred for one hour. Then, 180 g of cyclohexanone and 180 g of water were added to the mixture and stirred for 30 minutes. An aqueous layer formed in the mixture was separated to obtain a styrene-maleic acid copolymer. The weight average molecular weight of the styrene-dodecyl maleate copolymer thus obtained was 12000.

Synthesis Example 3

Polymer Composition 3

24 g of styrene-acrylic resin emulsion (Shouwa Koubunshi Co., Ltd. AlP1761; resin solid content: 50%) was mixed with 96 g of propyleneglycol monomethyl ether acetate and heated for one hour at 30° C. The weight average molecular weight of the styrene-maleic anhydride copolymer 1 thus obtained was 4400.

Synthesis Example 4

Polymer Composition 4

432 g of cyclohexanone and 3 g of azobisisobutyronitrile were poured into a five-necked reaction vessel having a capacity of one litter. Then, while introducing nitrogen gas into the reaction vessel, the resultant mixture was heated to 80° C. Then, a mixed liquid constituted by 98.9 g of styrene and 9.1 g of acrylic acid was added drop-wise to the above mixture taking two hours. 30 minutes after finishing of the dropping of the mixed liquid, 3 g of azoisobutyronitrile was added to the resultant mixture and the mixture thus obtained was heated for 5 hours to obtain a styrene-acrylic acid copolymer. The weight average molecular weight of the styrene-acrylic acid copolymer thus obtained was 6900.

Synthesis Example 5

Polymer Composition 5

432 g of propyleneglycol monomethyl ether acetate and 13 g of azobisisobutyronitrile were poured into a five-necked reaction vessel having a capacity of one litter. Then, while introducing nitrogen gas into the reaction vessel, the resultant mixture was heated to 80° C. Then, a mixed liquid constituted by 98.9 g of styrene and 9.1 g of acrylic acid was added drop-wise to the above mixture taking two hours. 30 minutes after finishing of the dropping of the mixed liquid, 6.5 g of azoisobutyronitrile was added to the resultant mixture and the mixture thus obtained was heated for 5 hours to obtain a styrene-acrylic acid copolymer. The weight average molecular weight of the styrene-acrylic acid copolymer thus obtained was 3100.

Synthesis Example 6

Polymer Composition 6

432 g of propyleneglycol monomethyl ether acetate and 13 g of azobisisobutyronitrile were poured into a five-necked reaction vessel having a capacity of one litter. Then, while introducing nitrogen gas into the reaction vessel, the resultant mixture was heated to 80° C. Then, a mixed liquid constituted by 96.3 g of styrene and 11.8 g of acrylic acid was added drop-wise to the above mixture taking two hours. 30 minutes after finishing of the dropping of the mixed liquid, 6.5 g of azoisobutyronitrile was added to the resultant mixture and the mixture thus obtained was heated for 5 hours to obtain a styrene-acrylic acid copolymer. The weight average molecular weight of the styrene-acrylic acid copolymer thus obtained was 3000.

Synthesis Example 7

Polymer Composition 7

24 g of styrene-acrylic resin emulsion (Shouwa Koubunshi Co., Ltd. AlP3770; resin solid content: 50%) was mixed with 96 g of propyleneglycol monomethyl ether acetate and heated for one hour at 30° C. The weight average molecular weight of the styrene-acrylic acid copolymer 1 thus obtained was 8600.

Synthesis Example 8

Polymer Composition 8

120 g of styrene, 20 g of maleic anhydride, 420 g of cyclohexanone and 2 g of azobisisobutyronitrile were poured into a five-necked reaction vessel having a capacity of 2 litters. Then, while introducing nitrogen gas into the reaction vessel, the resultant mixture was heated for 15 hours at 80° C., thereby obtaining styrene-maleic anhydride copolymer. The weight average molecular weight of the styrene-maleic anhydride copolymer 1 thus obtained was 37000. Then, 75 g of 20% aqueous solution of sodium hydroxide was added to the styrene-maleic anhydride copolymer 1 thus obtained and the resultant mixture was heated for one hour at 75° C. After being cooled down to 30° C., the mixture thus obtained was mixed with 170 g of 10% hydrochloric acid and stirred for one hour. Then, 180 g of cyclohexanone and 180 g of water were added to the mixture and stirred for 30 minutes. An aqueous layer formed in the mixture was separated to obtain a styrene-maleic acid copolymer. The weight average molecular weight of the styrene-maleic acid copolymer thus obtained was 35500.

Synthesis Example 9

Polymer Composition 9

120 g of styrene, 30 g of maleic anhydride, 420 g of cyclohexanone and 2 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining styrene-maleic anhydride copolymer. The weight average molecular weight of the styrene-maleic anhydride copolymer 1 thus obtained was 13000. Then, 75 g of 20% aqueous solution of sodium hydroxide was added to the styrene-maleic anhydride copolymer 1 thus obtained and the resultant mixture was heated for one hour at 75° C. After being cooled down to 30° C., the mixture thus obtained was mixed with 170 g of 10% hydrochloric acid and stirred for one hour. Then, 180 g of cyclohexanone and 180 g of water were added to the mixture and stirred for 30 minutes. An aqueous layer formed in the mixture was separated to obtain a styrene-maleic acid copolymer. The weight average molecular weight of the styrene-maleic acid copolymer thus obtained was 12000.

Synthesis Example 10

Polymer Composition 10

142.5 g of styrene, 7.5 g of maleic anhydride, 420 g of cyclohexanone and 2 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining styrene-maleic anhydride copolymer 4. The weight average molecular weight of the styrene-maleic anhydride copolymer 4 thus obtained was 13000.

Then, 75 g of 20% aqueous solution of sodium hydroxide was added to the styrene-maleic anhydride copolymer 4 thus obtained and the resultant mixture was heated for one hour at 75° C. After being cooled down to 30° C., the mixture thus obtained was mixed with 170 g of 10% hydrochloric acid and stirred for one hour. Then, 180 g of cyclohexanone and 180 g of water were added to the mixture and stirred for 30 minutes. An aqueous layer formed in the mixture was separated to obtain polymer composition 10 formed of styrene-maleic acid copolymer. The weight average molecular weight of polymer composition 10 formed of styrene-maleic acid copolymer thus obtained was 12000.

The results thus obtained are shown in the following Table 1.

TABLE 1

| Kinds of resin | Non-aromatic polyvalent carboxylic acid-containing monomer | Alcohol used | Solvents | Weight average molecular weight | Acid value of solid content | Content of styrene |
|---|---|---|---|---|---|---|
| Polymer composition 1 | Maleic anhydride | Water | Cyclohexanone | 11000 | 120 | 87.8 |
| Polymer composition 2 | Maleic anhydride | Dodecanol | Cyclohexanone | 12000 | 80 | 79.8 |
| Polymer composition 3 | Acrylic acid | — | PGMAc | 4400 | 105 | 81.1 |
| Polymer composition 4 | Acrylic acid | — | Cyclohexanone | 6900 | 60 | 88.3 |

TABLE 1-continued

| Kinds of resin | Non-aromatic polyvalent carboxylic acid-containing monomer | Alcohol used | Solvents | Weight average molecular weight | Acid value of solid content | Content of styrene |
|---|---|---|---|---|---|---|
| Polymer composition 5 | Acrylic acid | — | PGMAc | 3100 | 50 | 88.3 |
| Polymer composition 6 | Acrylic acid | — | PGMAc | 3000 | 70 | 85 |
| Polymer composition 7 | Maleic anhydride | Dodecanol | Cyclohexanone | 8600 | 215 | 70 |
| Polymer composition 8 | Maleic anhydride | Water | Cyclohexanone | 35500 | 160 | 86 |
| Polymer composition 9 | Maleic anhydride | Water | Cyclohexanone | 12000 | 215 | 80 |
| Polymer composition 10 | Maleic anhydride | Water | Cyclohexanone | 12000 | 9 | 95 |

(Synthesis of Acrylic Resin)

Acrylic resins employed in Examples and Comparative Examples were synthesized as explained below. Incidentally, the molecular weight of acrylic resin was a weight average molecular weight reduced as polystyrene and measured by means of gel permeation chromatography (GPC).

Synthesis Example 1

Acrylic Resin 1

800 g of propyleneglycol monomethyl ether acetate, 10 g of methacrylic acid, 40 g of methyl methacrylate, 80 g of butyl methacrylate, 40 g of hydroxyethyl methacrylate and 2 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining acrylic resin 1. The weight average molecular weight of the acrylic resin 1 thus obtained was 40000.

Synthesis Example 2

Acrylic Resin 2

Acrylic resin 2 was obtained in the same manner as described in Synthesis Example 1 except that weight of methacrylic acid employed was 40 g. The weight average molecular weight of the acrylic resin 2 thus obtained was 40000.

Synthesis Example 3

Acrylic Resin 3

800 g of propyleneglycol monomethyl ether acetate, 30 g of methacrylic acid, 70 g of butyl methacrylate, 40 g of hydroxyethyl methacrylate, 60 g of p-cumylphenoxymethyl methacrylate and 2 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining acrylic resin 3. The weight average molecular weight of the acrylic resin 3 thus obtained was 30000.

Synthesis Example 4

Acrylic Resin 4

Acrylic resin 4 was obtained in the same manner as described in Synthesis Example 3 except that weight of methacrylic acid employed was 33 g. The weight average molecular weight of the acrylic resin 4 thus obtained was 30000.

Synthesis Example 5

Acrylic Resin 5

800 g of propyleneglycol monomethyl ether acetate, 40 g of methacrylic acid, 40 g of butyl methacrylate, 60 g of hydroxyethyl methacrylate, 60 g of p-cumylphenoxymethyl methacrylate and 4 g of azobisisobutyronitrile were poured into a five-necked reaction vessel having a capacity of 2 litters. Then, while introducing nitrogen gas into the reaction vessel, the resultant mixture was heated for 6 hours at 80° C., thereby obtaining acrylic resin. This acrylic resin was further reacted with 45 g of methacryloyloxyethyl isocyanate for 8 hours at 60° C. to obtain acrylic resin 5. The weight average molecular weight of the acrylic resin 5 thus obtained was 25000.

Synthesis Example 6

Acrylic Resin 6

Acrylic resin 6 was obtained in the same manner as described in Synthesis Example 3 except that weight of methacryloyloxyethyl isocyanate employed was 15 g. The weight average molecular weight of the acrylic resin 6 thus obtained was 25000. The results thus obtained in these examples are shown in the following Table 2.

TABLE 2

| Kinds of resin | Solvents | Acid value of solid content | Double bond equivalent |
|---|---|---|---|
| Acrylic resin 1 | Cyclohexanone | 19 | ∞ |
| Acrylic resin 2 | Cyclohexanone | 84 | ∞ |
| Acrylic resin 3 | Cyclohexanone | 126 | ∞ |
| Acrylic resin 4 | Cyclohexanone | 185 | ∞ |
| Acrylic resin 5 | Cyclohexanone | 54 | 470 |
| Acrylic resin 6 | Cyclohexanone | 54 | 2100 |

(Synthesis of Pigments)

The pigments employed in Examples and Comparative Examples were synthesized as described below.

(Blue Pigment)

200 parts of a blue pigment 1 (C.I. Pigment Blue 15:6; Toyo Ink Manufacturing Co.; "LIONOL BLUE ES"; B-1), 1600 parts of sodium chloride and 100 parts of diethylene glycol (Tokyo Kasei Co., Ltd.) were put into a 1 gallon stainless steel kneader (Inoue Seisakusho Co., Ltd.) and kneaded for 12 hours at a temperature of 70° C. Then, the resultant mixture was introduced into about 5 litters of hot water and stirred for about one hour by means of a high-speed mixer while heating it at a temperature of about 70° C. to obtain a slurry product. This slurry product was then subjected to filtration and water washing to remove sodium chloride and diethylene glycol and dried for 24 hours at a temperature of 80° C. to obtain 198 parts of a salt milling-treated pigment (Blue pigment 2).

Further, 160 parts of a blue pigment 2, 1600 parts of sodium chloride and 100 parts of diethylene glycol (Tokyo Kasei Co., Ltd.) were put into a 1 gallon stainless steel kneader (Inoue Seisakusho Co., Ltd.) and kneaded for 15 hours at a temperature of 70° C. Then, the resultant mixture was introduced into about 5 litters of hot water and stirred for about one hour by means of a high-speed mixer while heating it at a temperature of about 70° C. to obtain a slurry product. This slurry product was then subjected to filtration and water washing to remove sodium chloride and diethylene glycol and dried for 24 hours at a temperature of 80° C. to obtain 158 parts of a salt milling-treated pigment (Blue pigment 3).

(Violet Pigment)

300 parts of a violet pigment 1 was put into 3000 parts of 96% sulfuric acid and agitated for one hour and then the resultant mixture was poured into water of 5° C. and agitated for one hour. After finishing this one-hour agitation, the resultant mixture was subjected to filtration and washed with hot water until the wash water became neutral. The mixture thus washed was then dried to obtain acid pasting-treated pigment. 120 parts of the acid pasting-treated pigment thus obtained, 1600 parts of sodium chloride and 100 parts of diethylene glycol (Tokyo Kasei Co., Ltd.) were put into a 1 gallon stainless steel kneader (Inoue Seisakusho Co., Ltd.) and kneaded for 18 hours at 90° C. Then, the resultant mixture was introduced into about 5 litters of hot water and stirred for about one hour by means of a high-speed mixer while heating it at a temperature of about 70° C. to obtain a slurry product. This slurry product was then subjected to filtration and water washing to remove sodium chloride and diethylene glycol and dried for 24 hours at a temperature of 80° C. to obtain 118 parts of a salt milling-treated pigment (Red pigment 2).

(Red Pigment)

136 parts of a red pigment 1 (C.I. Pigment Red 254; Ciba Specialty Chemicals Co., Ltd.; "IRGAPHOR RED B-CF"), 24 parts of a dispersing agent A-1, 1600 parts of sodium chloride and 190 parts of diethylene glycol (Tokyo Kasei Co., Ltd.) were put into a 1 gallon stainless steel kneader (Inoue Seisakusho Co., Ltd.) and kneaded for 8 hours at a temperature of 60° C. Then, the resultant mixture was introduced into about 5 litters of hot water and stirred for about one hour by means of a high-speed mixer while heating it at a temperature of about 70° C. to obtain a slurry product. This slurry product was then subjected to filtration and water washing to remove sodium chloride and diethylene glycol and dried for 24 hours at a temperature of 80° C. to obtain 156 parts of a salt milling-treated pigment (Red pigment 2).

160 parts of a red pigment 3 (C.I. Pigment Red 177; Ciba Specialty Chemicals Co., Ltd.; "CROMOPHTAL RED R-3"), 1600 parts of sodium chloride and 190 parts of diethylene glycol (Tokyo Kasei Co., Ltd.) were put into a 1 gallon stainless steel kneader (Inoue Seisakusho Co., Ltd.) and kneaded for 12 hours at a temperature of 60° C. Then, the resultant mixture was introduced into about 5 litters of hot water and stirred for about one hour by means of a high-speed mixer while heating it at a temperature of about 70° C. to obtain a slurry product. This slurry product was then subjected to filtration and water washing to remove sodium chloride and diethylene glycol and dried for 24 hours at a temperature of 80° C. to obtain 156 parts of a salt milling-treated pigment (Red pigment 4).

(Green Pigment)

46 parts of zinc phthalocyanine was dissolved in a molten salt consisting of 356 parts of aluminum chloride and 6 parts of sodium chloride and heated to a temperature of 200° C. Then, the resultant solution was cooled down to 130° C. and stirred for one hour. Thereafter, the reaction temperature was raised up to 180° C. and bromine was added drop-wise at a rate of 10 parts per hour to this reaction mixture taking 10 hours. Then, chlorine was added drop-wise at a rate of 0.8 part per hour to this reaction mixture taking 5 hours. The resultant reaction mixture was gradually poured into 3200 parts of water and then subjected to filtration and water washing to obtain 107.8 parts of crude zinc phthalocyanine halide pigment. An average number of bromine atoms included in one molecule of this crude zinc phthalocyanine halide pigment was 14.1 and an average number of chlorine atoms included in one molecule of this crude zinc phthalocyanine halide pigment was 1.9. Then, 120 parts of this crude zinc phthalocyanine halide pigment, 1600 parts of pulverized sodium chloride, and 270 parts of diethylene glycol were put into a 1 gallon stainless steel kneader (Inoue Seisakusho Co., Ltd.) and kneaded for 12 hours at a temperature of 70° C. Then, the resultant mixture was poured into 5000 parts of hot water and stirred for about one hour by means of a high-speed mixer while heating it at a temperature of about 70° C. to obtain a slurry product. This slurry product was then subjected to repeated filtration and water washing to remove sodium chloride and the solvent and dried for 24 hours at a temperature of 80° C. to obtain 117 parts of a salt milling-treated pigment (Green pigment 1).

(Yellow Pigment)

100 parts of a quinophthalone-based yellow pigment PY138 (BASF Co., Ltd.; "PARIOTOL YELLOW K0961HD"), 5 parts of a pigment derivative (D-3), 750 parts of pulverized common salt and 180 parts of diethylene glycol (Tokyo Kasei Co., Ltd.) were put into a 1 gallon stainless steel kneader (Inoue Seisakusho Co., Ltd.) and kneaded for 6 hours at a temperature of 60° C. Then, the resultant mixture was introduced into 3000 parts of hot water and stirred for about one hour by means of a high-speed mixer while heating it at a temperature of about 80° C. to obtain a slurry product. This slurry product was then subjected to repeated filtration and water washing to remove the common salt and the solvent and dried for 24 hours at a temperature of 80° C. to obtain 100 parts of a salt milling-treated pigment (Yellow pigment 1).

Example 1

A blue color composition to be used for manufacturing a color filter was prepared according to the following procedures.

<Blue Color Composition 1>

A mixture having the following composition was agitated to obtain a uniform mixture and then subjected to dispersion for 5 hours by making use of a sand mill employing glass beads having a diameter of 1 mm. Then, the resultant mixture was filtered using a 5 µm-mesh filter to obtain a dispersion of blue pigment.

| Blue pigment 3 | 7.9 parts |
| Violet pigment 2 | 5.8 parts |
| Dispersing agent ("AJISPER PB821", Ajinomoto FineTechno Co., Ltd.) | 1.8 parts |
| Acrylic resin 2 (solid content: 20%) | 36.5 part |
| Cyclohexanone | 48 parts |

Subsequently, a mixture having the following composition was agitated to obtain a uniform mixture and then subjected to filtration using a 5 μm-mesh filter to obtain blue color composition 1.

| Above-described dispersion | 42 parts |
| Polymer composition 1 | 12 parts |
| Acrylic resin 5 | 4 parts |
| Trimethylol propane triacrylate ("Biscoat #295"; Ohsaka Organic Chemistries Co., Ltd.) | 4.8 parts |
| Photopolymerization initiator ("IRGACURE-369", Ciba-Geigy Co., Ltd.) | 2.8 parts |
| Photo-sensitizer ("EAB-F", Hodogaya Kagaku Co., Ltd.) | 0.2 part |
| Cyclohexanone | 34.2 parts |

Examples 2-11, Comparative Examples 1-9

The color compositions 2-20 were obtained by repeating the same procedure as described in Example 1 except that the pigment in the dispersion and the resin contained in the dispersion and color composition were replaced by the pigments and the resins described in the following Table 3.

TABLE 3

| | | Pigment | | Resin in dispersion | | | | Resin in color composition | | | |
| | | | | Polymer composition | | Acrylic resin | | Polymer composition | | Acrylic resin | |
| | | Kinds | | | Additive | | Additive | | Additive | | Additive |
| | | Pigment 1 | Pigment 2 | Kinds | amount | Kinds | amount | Kinds | amount | Kinds | amount |
| Ex. 1 | Color composition 1 | Blue pigment 1 | Violet pigment 2 | — | — | Acrylic resin 2 | 36.5 parts | Polymer composition 1 | 12 parts | Acrylic resin 5 | 4 parts |
| Ex. 2 | Color composition 2 | Blue pigment 1 | Violet pigment 2 | — | — | Acrylic resin 2 | 36.5 parts | Polymer composition 2 | 12 parts | Acrylic resin 5 | 4 parts |
| Ex. 3 | Color composition 3 | Blue pigment 1 | Violet pigment 2 | — | — | Acrylic resin 2 | 36.5 parts | Polymer composition 3 | 12 parts | Acrylic resin 5 | 4 parts |
| Ex. 4 | Color composition 4 | Blue pigment 1 | Violet pigment 2 | — | — | Acrylic resin 2 | 36.5 parts | Polymer composition 4 | 12 parts | Acrylic resin 5 | 4 parts |
| Ex. 5 | Color composition 5 | Blue pigment 1 | Violet pigment 2 | — | — | Acrylic resin 2 | 36.5 parts | Polymer composition 5 | 12 parts | Acrylic resin 5 | 4 parts |
| Ex. 6 | Color composition 6 | Blue pigment 1 | Violet pigment 2 | — | — | Acrylic resin 2 | 36.5 parts | Polymer composition 6 | 12 parts | Acrylic resin 5 | 4 parts |
| Ex. 7 | Color composition 7 | Blue pigment 1 | Violet pigment 2 | — | — | Acrylic resin 2 | 36.5 parts | Polymer composition 4 | 12 parts | Acrylic resin 3 | 4 parts |
| Ex. 8 | Color composition 8 | Blue pigment 1 | Violet pigment 2 | Polymer composition 2 | 25.5 parts | Acrylic resin 2 | 11.0 parts | Polymer composition 4 | 16 parts | None | — |
| Ex. 9 | Color composition 9 | Blue pigment 1 | Violet pigment 2 | Polymer composition 4 | 25.5 parts | Acrylic resin 2 | 11.0 parts | Polymer composition 4 | 16 parts | None | — |
| Ex. 10 | Color composition 10 | Green pigment 1 | Yellow pigment 2 | — | — | Acrylic resin 2 | 36.5 parts | Polymer composition 4 | 16 parts | None | — |
| Ex. 11 | Color composition 11 | Red pigment 2 | Red pigment 2 | — | — | Acrylic resin 2 | 36.5 parts | Polymer composition 4 | 16 parts | None | — |
| Comp. Ex. 1 | Color composition 12 | Blue pigment 1 | Violet pigment 2 | — | — | Acrylic resin 2 | 36.5 parts | Polymer composition 7 | 12 parts | Acrylic resin 5 | 4 parts |
| Comp. Ex. 2 | Color composition 13 | Blue pigment 1 | Violet pigment 2 | — | — | Acrylic resin 2 | 36.5 parts | Polymer composition 8 | 12 parts | Acrylic resin 5 | 4 parts |
| Comp. Ex. 3 | Color composition 14 | Blue pigment 1 | Violet pigment 2 | — | — | Acrylic resin 2 | 36.5 parts | Polymer composition 9 | 12 parts | Acrylic resin 5 | 4 parts |
| Comp. Ex. 4 | Color composition 15 | Blue pigment 1 | Violet pigment 2 | Polymer composition 7 | 25.5 parts | Acrylic resin 2 | 11.0 parts | Polymer composition 7 | 12 parts | Acrylic resin 5 | 4 parts |
| Comp. Ex. 5 | Color composition 16 | Blue pigment 1 | Violet pigment 2 | — | — | Acrylic resin 2 | 36.5 parts | Polymer composition 8 | 12 parts | Acrylic resin 1 | 4 parts |
| Comp. Ex. 6 | Color composition 17 | Green pigment 1 | Yellow pigment 2 | — | — | Acrylic resin 2 | 36.5 parts | Polymer composition 7 | 12 parts | Acrylic resin 5 | 4 parts |
| Comp. Ex. 7 | Color composition 18 | Green pigment 1 | Yellow pigment 2 | — | — | Acrylic resin 2 | 36.5 parts | Polymer composition 10 | 12 parts | Acrylic resin 5 | 4 parts |
| Comp. Ex. 8 | Color composition 19 | Green pigment 1 | Yellow pigment 2 | Polymer composition 7 | 25.5 parts | Acrylic resin 2 | 11.0 parts | Polymer composition 7 | 12 parts | Acrylic resin 5 | 4 parts |
| Comp. Ex. 9 | Color composition 20 | Red pigment 2 | Red pigment 2 | — | — | Acrylic resin 2 | 36.5 parts | Polymer composition 7 | 12 parts | Acrylic resin 5 | 4 parts |

Example 12

Preparation of Photosensitive Resin Composition 1 for the Spacing Layer

A mixture having the following composition was agitated to obtain a uniform mixture and then subjected to filtration using a 5 μm-mesh filter to obtain photosensitive resin composition 1 to be used for the formation of a spacing layer.

| | |
|---|---|
| Polymer composition 5 | 16 parts |
| Photopolymerizable monomer ("Aronix M-402"; Toa Gosei Co., Ltd.) | 2.4 parts |
| Photopolymerization initiator ("IRGACURE-907", Ciba-Geigy Co., Ltd.) | 2.8 parts |
| Photo-sensitizer ("Diethylthioxanthone-S"; Nippon Kayaku Co., Ltd.) | 0.5 part |
| Photo-sensitizer ("2-mercaptobenzothizole"; Kanto Kagaku Co., Ltd.) | 0.5 part |
| Cyclohexanone | 40.2 parts |

Example 13

Preparation of Photosensitive Resin Composition 2 to be Used for Forming a Space Controlling Layer for Controlling Cell Gap A mixture having the following composition was agitated to obtain a uniform mixture and then subjected to filtration using a 5 μm-mesh filter to obtain photosensitive resin composition 2 to be used for forming a space controlling layer for controlling cell gap.

| | |
|---|---|
| Polymer composition 5 | 16 parts |
| Trimethylolpropane triacrylate ("Biscoat #295"; Ohsaka Organic Chemistries Co., Ltd.) | 4.8 parts |
| Photopolymerizable monomer ("Aronix M-402"; Toa Gosei Co., Ltd.) | 2.4 parts |
| Photopolymerization initiator ("IRGACURE-907", Ciba-Geigy Co., Ltd.) | 2.8 parts |
| Photo-sensitizer ("EAB-F", Hodogaya Kagaku Co., Ltd.) | 0.2 part |
| Cyclohexanone | 40.2 parts |

Example 14

Preparation of Photosensitive Resin Composition 3 to be Used for Forming a Retardation Layer A mixture having the following composition was agitated to obtain a uniform mixture and then subjected to filtration using a 5 μm-mesh filter to obtain photosensitive resin composition 3 to be used for forming a retardation layer.

| | |
|---|---|
| Polymer composition 5 | 16 parts |
| Trimethylolpropane triacrylate ("Biscoat #295"; Ohsaka Organic Chemistries Co., Ltd.) | 4.8 parts |
| Photopolymerizable monomer ("Aronix M-402"; Toa Gosei Co., Ltd.) | 2.4 parts |
| Photopolymerization initiator ("IRGACURE-907", Ciba-Geigy Co., Ltd.) | 2.8 parts |
| Photo-sensitizer ("EAB-F", Hodogaya Kagaku Co., Ltd.) | 0.2 part |
| Cyclohexanone | 40.2 parts |

Comparative Examples 10-12

Photosensitive resin compositions 4-6 were obtained in the same manner as described in Examples 12-14 except that polymer composition 8 was used as the resin.

The color compositions according to the aforementioned Examples and Comparative Examples were evaluated by measuring the following characteristics.

1. Assessment of Long-Term Storage Stability

The initial viscosity of a green color composition which was prepared the day before and the aged viscosity of the same green color composition which was prepared one week ago and promoted in viscosity at 40° C. were measured by making use of E-type viscometer (ELD type viscometer, Toki Sangyo Co., Ltd.) under the conditions of: 25° C. in temperature and 20 rpm in revolving speed. Based on the values of the initial viscosity and of the aged viscosity, the rate of change of the aged viscosity was calculated.

[Rate of change of the aged viscosity]=|{(initial viscosity)−(aged viscosity)}/(initial viscosity)|×100

The assessment of the long-term storage stability was performed based on the following standard.

○: 10% or less in the rate of change of the aged viscosity
Δ: 10%-20% in the rate of change of the aged viscosity
X: More than 20% in the rate of change of the aged viscosity 2. Retardation (Rth) in a Thickness Direction Each of coated color films was manufactured according to the following procedure and the values of retardation in a thickness direction were measured.

By means of spin coating, the surface of a glass substrate was coated with each of color compositions shown in above Table 3 and then pre-baked for 20 minutes in a clean oven at a temperature of 70° C. Then, after being cooled to room temperature, the substrate was exposed to ultraviolet rays by making use of an ultra-high pressure mercury lamp. Thereafter, the resultant substrate was subjected to spray development by making use of an aqueous solution of sodium carbonate heated up to 23° C., after which the resultant substrate was washed with ion-exchange water and air-dried. Subsequently, the resultant substrate was post-baked for 30 minutes in a clean oven at a temperature of 230° C., thereby forming a colored coated film of each of colors. The film thickness as dried of the coated film was 1.8 μm in every case. Further, the photosensitive resin compositions for the spacing layer, the space controlling layer for controlling cell gap and the retardation layer, all layers being designed to make uniform the cell gap of a liquid crystal display device, are deposited in the same procedures as described above, thereby forming these coated films.

The values of retardation in a thickness direction were determined as follows. Namely, by making use of a retardation in a thickness direction measuring apparatus ("RETS-100"; Ohtsuka Denshi Co., Ltd.), the retardation Δ(λ) of the coated color film was measured from the direction which was angled by 45° from the normal direction of substrate having the coated color film formed thereon. Then, by making use of this value, the three-dimensional refractive index was calculated and, based on this three-dimensional refractive index, the value Rth of retardation in a thickness direction was calculated according to the following equation (1). In this case, a wavelength of 610 nm was used for the red color film, a wavelength of 550 nm was used for the green color film, and a wavelength of 450 nm was used for the blue color film.

$$Rth=\{(Nx+Ny)/2-Nz\} \times d \quad (1)$$

(wherein Nx is a refractive index in x direction in the plane of color pixel layer; Ny is a refractive index in y direction in the plane of color pixel layer; and Nz is a refractive index in the thickness direction of color pixel layer; x direction is defined as a lagging axis represented by Nx≧Ny; and d is a thickness (nm) of color pixel layer.

The following Table 4 illustrates the value Rth of retardation in a thickness direction of each of coated color films which were manufactured by making use of each of color compositions shown in above Table 3. When it was designed to minimize the coloring of an image at display in the darkened state as it is viewed obliquely in the combination of the value Rth of retardation in a thickness direction of the retardation plate and liquid crystal material to be used in a liquid crystal display device with the value Rth of retardation in a thickness direction of the color pixel layer, the value Rth of retardation in a thickness direction of each of color pixel layers was: −10 nm−+2 nm in the case of the red pixel, −10 nm-0 nm in the case of the green pixel, and −10 nm−+2 nm in the case of the blue pixel.

The retardation in a thickness direction value of the color pixels was evaluated according to the following standard.

○: The value was confined to −10 nm−+2 nm in the case of the red pixel, −10 nm-0 nm in the case of the green pixel, and −10 nm−+2 nm in the case of the blue pixel.

X: The value was not confined to these ranges.

The results of above assessment are shown in the following Table 4.

With respect to the photosensitive compositions for the space controlling layer for controlling cell gap and the retardation layer, the values of Rth thereof obtained are shown in the following Table 4.

3. Measurement of Contrast

The contrast was calculated as follows. Each of color pixels formed on a transparent substrate was sandwiched between a pair of polarizing plates and one of the polarizing plates is irradiated with a back light and permitted to emit from the other of the polarizing plates and the luminance of light emitted from said other polarizing plate is measured by means of a luminance meter, thereby measuring the luminance of light under a condition wherein these polarizing plates are disposed parallel with each other to determine the luminance of light (Lp) and also measuring the luminance of light under a condition wherein these polarizing plates are disposed intersected orthogonally with each other to determine the luminance of light (Lc), after which the ratio between (Lp) and (Lc) is calculated to determine the contrast C(C=Lp/Lc).

CR is defined as the value of contrast obtained in the case of red color layer (coated film), CG is defined as the value of contrast obtained in the case of green color layer (coated film), and CB is defined as the value of contrast obtained in the case of blue color layer (coated film). CS is defined as the value of contrast obtained in the case where only the transparent substrate was existed without accompanying the color filter (color layers). The color filter contrast was measured and calculated according to the aforementioned equation with regard to the color filter substrate having the red color pixel, the green color pixel and the blue color pixel formed on the surface of black matrix. The color filter contrast is more important than the contrasts of these color layers as the color filter contrast actually has direct bearing on the picture qualities of a liquid crystal display device.

If it is desired to fully meet persistent demands for extremely high picture qualities of a large-size liquid crystal display device such as a televisions, a monitor, etc., a color filter contrast of as high as not less than 9000 is needed.

When the contrast ratio between CS and the contrast of each of color layers satisfies the conditions of, for example, CR/CS>0.45, CG/CS>0.45 and CB/CS>0.45, it is possible to obtain excellent front visibility on displaying black image of the liquid crystal display device. Namely, it is possible to reproduce a tight black image without accompanying leakage of light. On the other hand, if the conditions of: CR/CS>0.45, CG/CS>0.45 and CB/CS>0.45 are not satisfied, the leakage of light would become prominent on displaying black image, thus failing to obtain a liquid crystal display device which is excellent in front visibility.

Furthermore, when the difference in retardation among every colors is minimized, it is possible to obtain a liquid crystal device which is excellent in both oblique visibility and front visibility. By the way, even if the conditions of CR/CS>0.45, CG/CS>0.45 and CB/CS>0.45 are entirely satisfied, if the difference in retardation among every colors is large, the oblique visibility may become insufficient. In color layers employed in Examples, those exhibiting a contrast ratio of more than 0.45 were used.

Incidentally, the measurement of contrast was executed by making use of a color luminance meter (for example, "BM-5A"; Topcon Co., Ltd.). Specifically, under the conditions where only a color pixel layer having a single coated film formed on a transparent substrate or only a transparent substrate is sandwiched between a pair of polarizing plates, the luminance of light (Lp) where these polarizing plates are disposed such that the polarizing axes are parallel with each other and the luminance of light (Lc) under a condition wherein these polarizing plates are disposed such that the polarizing axes are intersected orthogonally with each other are respectively measured at a viewing angle of 2°, for example. As for the polarizing plate, it is possible to employ "NPF-SE1224DU" (Nittoh Denko Co., Ltd.). As for the light source for the backlight, it is possible to employ those having characteristics of: luminance=1937 cd/m², a chromaticity coordinate (x, y) in XYZ system of color representation chromaticity diagram is (0.316, 0.301), color temperature=6525K and chromaticity deviation duv=−0.0136.

4. Evaluation of Sensitivity

The sensitivity of each of the photosensitive color compositions as well as the sensitivity of photosensitive compositions for the space controlling layer for controlling cell gap and of photosensitive compositions for the retardation layer shown in above Table 3 was evaluated as described below.

Namely, at first, by means of spin coating, the surface of a glass substrate was coated with each of the photosensitive compositions thus obtained and then prebaked at 70° C. for 15 minutes, thereby forming a coated film having a film thickness of 2.3 μm. Then, by means of proximity exposure system using ultraviolet ray as an exposure light source, ultraviolet exposure was performed through a photomask provided with a fine line pattern of 50 μm. The dosage of exposure was set to eight levels, i.e. 30 J/cm², 40 J/cm², 50 J/cm², 60 J/cm², 70 J/cm², 80 J/cm², 90 J/cm² and 100 J/cm².

Then, by making use of 1.25 wt % sodium carbonate, the coated film was shower-developed and then washed. The resultant coated film was then subjected to a heat treatment for 20 minutes at 230° C., thus accomplishing the patterning of the coated film.

The film thickness of the color pixel thus obtained was divided by the film thickness (2.3 μm) of the non-exposure/non-development portion, thereby calculating the residual film ratio thereof. Then, an exposure sensitivity curve was plotted in a graph with the abscissa representing exposure dosages and the ordinate thereof representing residual film ratios after the development. Based on the exposure sensitivity curve thus obtained, the minimum quantity of exposure which enabled the residual film ratio to keep 80% or more was defined as a saturated exposure dosage. Then, the sensitivity of the photosensitive resin compositions was evaluated according to the following standard.

○: Saturated exposure dosage was not more than 50 J/cm².
Δ: Saturated exposure dosage was more than 50 J/cm² but not more than 100 J/cm².
X: Saturated exposure dosage was more than 100 J/cm².

5. Evaluation of Patterning Properties

The patterning properties of each of the photosensitive color compositions as well as each of the photosensitive compositions for the space controlling layer for controlling cell gap and each of the photosensitive compositions for the retardation layer, which were prepared in Examples and Comparative Examples, were evaluated as described below.

Namely, at first, by means of spin coating, the surface of a glass substrate was coated with each of the photosensitive color compositions thus obtained and then prebaked at 70° C. for 15 minutes, thereby forming a coated film having a film thickness of 2.3 μm. Then, by means of proximity exposure system using ultraviolet ray as an exposure light source, ultraviolet exposure was performed through a photomask provided with a stripe pattern having a line width of 6-20 μm. The dosage of exposure employed was of the saturated exposure dosage which was varied in the same manner as described above.

Then, by making use of 1.25 wt % sodium carbonate, the coated film was shower-developed and then washed. The time for the development was appropriately determined so as to enable non-exposed coated film to be washed away. The resultant coated film was then subjected to a heat treatment for 20 minutes at 230° C., thus manufacturing test substrates.

6. Evaluation of Resistance to Chemicals

In the same manner as in the case of the above evaluation of patterning properties, a stripe pattern was formed on the surface of glass substrate and then the glass substrate was exposed to the following conditions. Any change in external appearance of the pattern after this exposure was observed by means of an optical microscope.

N-methyl-2-pyrolidone solvent: Immersed for 30 minutes (24° C.)
Isopropyl alcohol solvent: Immersed for 30 minutes (24° C.)
γ-butyrolactone solvent: Immersed for 30 minutes (24° C.)

The resistance to chemicals was performed according to the following standard.

○: No change in external appearance under every conditions
X: Failures such as peeling of pattern, chipping or cracks were recognized.

The aforementioned results are shown in the following Table 4.

TABLE 4

| | Unit | Long-term storage stability | Evaluation of sensitivity (mJ/cm²) | Assessment on patterning property developing rate, adhesion | Thickness-wise phase-shifting value Rth (nm) | | Chemical resistance |
|---|---|---|---|---|---|---|---|
| Ex. 1 | Color composition 1 | ○ | ○ | ○ | −3 | ○ | ○ |
| Ex. 2 | Color composition 2 | ○ | ○ | ○ | −1 | ○ | ○ |
| Ex. 3 | Color composition 3 | ○ | ○ | ○ | −2 | ○ | ○ |
| Ex. 4 | Color composition 4 | ○ | ○ | ○ | −4 | ○ | ○ |
| Ex. 5 | Color composition 5 | ○ | ○ | ○ | −5 | ○ | ○ |
| Ex. 6 | Color composition 6 | ○ | ○ | ○ | −4 | ○ | ○ |
| Ex. 7 | Color composition 7 | ○ | Δ | ○ | −3 | ○ | Δ |
| Ex. 8 | Color composition 8 | ○ | Δ | ○ | −7 | ○ | Δ |
| Ex. 9 | Color composition 9 | ○ | Δ | ○ | −8 | ○ | Δ |
| Ex. 10 | Color composition 10 | ○ | Δ | ○ | −1 | ○ | Δ |
| Ex. 11 | Color composition 11 | ○ | Δ | ○ | 0 | ○ | Δ |
| Ex. 12 | Photosensitive resin composition 1 | ○ | ○ | ○ | 0 | ○ | ○ |
| Ex. 13 | Photosensitive resin composition 2 | ○ | ○ | ○ | −1 | ○ | ○ |
| Ex. 14 | Photosensitive resin composition 3 | ○ | ○ | ○ | −2 | ○ | ○ |
| Comp. Ex. 1 | Color composition 12 | X | ○ | X | 5 | X | Δ |
| Comp. Ex. 2 | Color composition 13 | X | ○ | X | −2 | ○ | Δ |
| Comp. Ex. 3 | Color composition 14 | X | ○ | X | 0 | ○ | Δ |
| Comp. Ex. 4 | Color composition 15 | X | ○ | X | 2 | X | Δ |
| Comp. | Color | X | Δ | X | 0 | ○ | Δ |

TABLE 4-continued

| | Unit | Long-term storage stability | Evaluation of sensitivity (mJ/cm²) | Assessment on patterning property developing rate, adhesion | Thickness-wise phase-shifting value Rth (nm) | | Chemical resistance |
|---|---|---|---|---|---|---|---|
| Ex. 5 | composition 16 | | | | | | |
| Comp. Ex. 6 | Color composition 17 | ○ | ○ | ○ | 4 | X | ○ |
| Comp. Ex. 7 | Color composition 18 | X | ○ | X | −12 | X | Δ |
| Comp. Ex. 8 | Color composition 19 | ○ | ○ | ○ | 1 | X | ○ |
| Comp. Ex. 9 | Color composition 20 | ○ | ○ | ○ | 5 | X | ○ |
| Comp. Ex. 10 | Photosensitive resin composition 4 | X | ○ | X | 6 | X | Δ |
| Comp. Ex. 11 | Photosensitive resin composition 5 | X | ○ | X | 5 | X | Δ |
| Comp. Ex. 12 | Photosensitive resin composition 6 | X | ○ | X | 4 | X | Δ |

It will be recognized from the above Table 4 that the resin compositions of Examples 1-14 wherein polymer compositions falling within the scope of the present invention were employed were all excellent in every respects including not only the long-term storage stability, sensitivity and patterning properties of the photosensitive resin composition and, furthermore, the color layer to be obtained through the curing of this photosensitive resin composition was excellent not only in the retardation in a thickness direction but also in chemical resistance.

Whereas, in the case of the resin compositions of Comparative Examples 1-12 wherein polymer compositions falling outside the scope of the present invention were employed, it will be recognized that at least any one of the aforementioned features was found unsatisfactory.

Example 15

1. Manufacture of a Color Filter

A color filter was manufactured through a combination of photosensitive color compositions shown in above Table 3 and by making use of the method described below.

First of all, by means of spin coating, the surface of a glass substrate having a black matrix formed thereon was coated with a photosensitive red color composition (color composition 11) in advance and then pre-baked for 20 minutes in a clean oven at a temperature of 70° C. Then, after being cooled to room temperature, the substrate was exposed, through a photomask, to ultraviolet rays by making use of an ultra-high pressure mercury lamp.

Thereafter, the resultant substrate was subjected to spray development by making use of an aqueous solution of sodium carbonate heated up to 23° C., after which the resultant substrate was washed with ion-exchange water and air-dried. Further, the resultant substrate was post-baked for 30 minutes in a clean oven at a temperature of 230° C., thereby forming a red color pixel having stripe-like configuration on the substrate.

Then, by making use of a photosensitive green composition (color composition 10), a green pixel was formed in the same manner as described above and, further, by making use of a photosensitive blue composition (color composition 1), the blue pixel was formed in the same manner as described above, thereby obtaining a color filter. The film thickness of each of these color pixels was 2.0 μm in every case.

2. Manufacture of a Liquid Crystal Display Device

An over-coat layer was formed on the surface of color filter thus obtained and then a polyimide alignment layer was formed thereon. Further, a polarizing plate was arranged on the opposite surface of the glass substrate. On the other hand, a TFT array and pixel electrodes were formed on one surface of another (second) glass substrate and a polarizing plate was arranged on the opposite surface of this second glass substrate.

A couple of glass substrates thus prepared were disposed to oppose with each other so as to make the electrode layers thereof face to each other. Then, these glass substrates were aligned with each other while securing a predetermined gap between these substrates by making use of spacer beads and then the outer circumference of this composite body of substrates was entirely sealed while leaving an opening for injecting a liquid crystal composition. Thereafter, a liquid crystal composition for VA was injected, via the opening, into the gap and then the opening was sealed. The polarizing plate was furnished with an optical compensation layer which was optimized so as to realize a wide viewing angle display.

The liquid crystal display device thus manufactured was assembled with a back light unit to obtain a liquid crystal panel of VA (vertical alignment) display mode.

Example 16, Comparative Examples 13 and 14

A color filters 2-4 were manufactured in the same manner as described in Example 15 except that the photosensitive color compositions described in the following Table 5 were employed respectively as the photosensitive color composition. Then, by making use of these color filters, liquid crystal display devices were manufactured.

Incidentally, the composition of the color composition 21 employed in Comparative Example 14 was as described below.

Pigments: Blue pigment 1, Violet pigment 2
Resin in the dispersion: 36.5 parts of acrylic resin 2
Resin in the color composition: 4.4 parts of polymer composition 4 and 12 parts of acrylic resin 6

The composition ratio of pigments, the quantity of dispersing agent and other composition ratio were the same as those of Example 1.

Followings are explanations on the retardation in a thickness direction of a green color layer employing a copper halide phthalocyanine pigment and representing a comparative example, and on the oblique visibility of the green color layer at black display in the darkened state.

A color composition 21 was manufactured by making use of a copper halide phthalocyanine pigment PG36 (Lyonol Green 6YK; Toyo Ink Manufacturing Co., Ltd.) as a green pigment.

Pigments: 8.3 parts of green pigment (PG36) and 5.4 parts of a yellow pigment 1

Resin in the dispersion: 36.5 parts of acrylic resin 2

Resin in the color composition: 16 parts of acrylic resin 6

The surface of a glass substrate was coated with this green color composition to a thickness of 2 μm and the retardation Rth of the coated film in a thickness direction thereof was measured. As a result, the Rth thereof was −13 nm.

Although the copper halide phthalocyanine pigment was high in contrast and suited for use as a green pigment for a green color pixel of color filter, the retardation in a thickness direction thereof was less than −10 nm. Because of this, the oblique visibility thereof was found poor. When the color filter which was provided with this green color pixel was evaluated as a liquid display device according to <Assessment of visibility of liquid crystal display device on displaying black image> to be described below, the black image was colored into reddish violet, indicating undesirable black image.

<Assessment of Visibility of Liquid Crystal Display Device on Displaying Black in a Darkened State>

The liquid crystal display devices manufactured as described above were respectively operated so as to display black in a darkened state and the quantity of the light leaked out from the liquid crystal panel (orthogonally permeated light; leaked light) in the normal direction (approximately vertical direction) of liquid crystal panel and in a slanted direction which was inclined by 45° from the normal direction (oblique angle) was visually observed. Further, the chromaticity as the panel was viewed in approximately vertical direction at display in the darkened state (u(⊥), v(⊥)) and the chromaticity as the panel was viewed obliquely by an angle of up to 60° in maximum from the normal direction (u(45), v(45)) were measured by making use of BM-5A (Topcon Co., Ltd.). Then, the color difference Δu'v' was calculated and the maximum value of Δu'v' under the condition of 0≦θ≦60° was determined. The ranking of assessment was as follows, the results being illustrated in the following Table 5.

○: Oblique coloring Δu'v' in the visibility assessment was not higher than 0.02

X: Oblique coloring Δu'v' in the visibility assessment was higher than 0.02

TABLE 5

| Color filter used | Photosensitive color composition used | | | Visibility assessment oblique staining |
|---|---|---|---|---|
| | Red | Green | Blue | |
| Ex. 15 Color filter 1 | Color composition 11 | Color composition 10 | Color composition 1 | ○ |
| Ex. 16 Color filter 2 | Color composition 11 | Color composition 10 | Color composition 5 | ○ |
| Comp. Ex. 13 Color filter 3 | Color composition 20 | Color composition 17 | Color composition 12 | X |

TABLE 5-continued

| Color filter used | Photosensitive color composition used | | | Visibility assessment oblique staining |
|---|---|---|---|---|
| | Red | Green | Blue | |
| Comp. Ex. 14 Color filter 4 | Color composition 20 | Color composition 18 | Color composition 21 | X |

It will be recognized from above Table 5 that in the cases of Examples 15 and 16 where the color filters employed in the liquid crystal display device were constructed such that the retardation in a thickness direction values of the red color pixel, the green color pixel and the blue color pixel fall within the range of 0 nm−−10 nm, the oblique visibility thereof was excellent.

Whereas, in the case of Comparative Examples 13 and 14, since the red color pixel, the green color pixel and the blue color pixel of the color filter were not constructed so as to enable the retardation in a thickness direction values thereof to fall within the range of 0 nm−−10 nm, the oblique visibility thereof was poor.

The results measured of the color difference Δu'v', the contrast of single color in the color pixel layers and the color filter contrast (CF contrast) in Examples 15 and 16 and Comparative Examples 13 and 14 are shown in the following Table 6.

TABLE 6

| | Δu'v' | Contrast | | | |
|---|---|---|---|---|---|
| | | Red | Green | Blue | CF contrast |
| Ex. 15 | 0.012 | 12850 | 9500 | 7350 | 9650 |
| Ex. 16 | 0.015 | 12850 | 9500 | 7280 | 9500 |
| Comp. Ex. 13 | 0.044 | 9900 | 8080 | 7200 | 8320 |
| Comp. Ex. 14 | 0.051 | 9900 | 7900 | 7050 | 7950 |

It will be recognized from above Table 6 that the contrast obtained in Examples 15 and 16 was higher than that of Comparative Examples 13 and 14.

What is claimed is:

1. A color filter for a liquid crystal display device, which exhibits a color filter contrast of 9000 or more and comprises a transparent substrate, and a plurality of color layers exhibiting different color from each other and formed on the transparent substrate, wherein each of the color layers is a cured film of a color resin composition containing a polymer composition obtained through a copolymerization of styrene and an unsaturated carboxylic acid-containing monomer, a content of the styrene in the polymer composition being confined to a range of not less than 75 mol. % and less than 95 mol. %, and a retardation in a thickness direction "Rth" of each of these color layers, which is represented by the following expression, is confined within a range of 0 nm to −10 nm:

$Rth = \{(Nx+Ny)/2 - Nz\} \times d$ wherein Nx is a refractive index in x-direction in a plane of a color pixel layer; Ny is a refractive index in y-direction in a plane of the color pixel layer; and Nz is a refractive index in a thickness direction of the color pixel layer, x direction is defined as a lagging axis represented by Nx≧Ny; and d is a thickness (nm) of the color pixel layer.

2. The color filter according to claim 1, wherein the color resin composition further comprises, together with the polymer composition, a photopolymerizable monomer, a photopolymerization initiator, acrylic resin and an organic pigment.

3. The color filter according to claim 1, wherein one of said plurality of color layers is a green color layer containing a green pigment consisting of zinc halide phthalocyanine pigment.

4. The color filter according to claim 1, wherein the color layer further comprises at least one layer selected from the group consisting of a spacing layer, a space controlling layer for controlling cell gap, and a retardation layer, and is formed on a surface of the transparent substrate.

5. A liquid crystal display device which is provided with the color filter claimed in claim 1, wherein a color difference $\Delta u'v'$ between a value of chromaticity as measured from a direction normal to a display surface, and a value of chromaticity as measured from in a direction of 60° inclined from the direction normal to a display surface and in a direction of an azimuthal angle of 45° at display in a darkened state, is not higher than 0.02.

* * * * *